United States Patent
Ehlert et al.

(10) Patent No.: US 9,499,267 B2
(45) Date of Patent: *Nov. 22, 2016

(54) VEHICLE ELEVATOR SYSTEMS AND METHODS

(71) Applicant: L-3 Communications Integrated Systems L.P., Waco, TX (US)

(72) Inventors: Wayne J. Ehlert, Hewitt, TX (US); Michael G. Glenn, Woodway, TX (US); James R. Grimes, Waco, TX (US); Loyd R. Hamilton, McGregor, TX (US); Christopher M. Jackson, Waco, TX (US); Mark A. McCoy, Hewitt, TX (US); Richard R. Pardun, Waco, TX (US); Paul H. Peterson, Waco, TX (US); Albert W. Ruggles, Waco, TX (US); Scot A. Stephens, Crawford, TX (US)

(73) Assignee: L-3 Communications Integrated Systems LP, Waco, TX (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/293,986

(22) Filed: Jun. 2, 2014

(65) Prior Publication Data

US 2014/0345979 A1 Nov. 27, 2014

Related U.S. Application Data

(63) Continuation of application No. 13/088,015, filed on Apr. 15, 2011, now Pat. No. 8,757,327.

(51) Int. Cl.
*B64D 9/00* (2006.01)
*B64D 11/00* (2006.01)
(Continued)

(52) U.S. Cl.
CPC .............. *B64D 9/00* (2013.01); *B64C 1/1407* (2013.01); *B64C 1/22* (2013.01); *B64D 11/00* (2013.01); *B66B 9/00* (2013.01); *B66B 11/0085* (2013.01); *B64C 2001/0027* (2013.01)

(58) Field of Classification Search
CPC ............. B64C 1/22; B64D 9/00; B66B 9/04; B66B 11/0085
See application file for complete search history.

(56) References Cited

U.S. PATENT DOCUMENTS

| 299,646 | A | | 6/1884 | Hutchinson | |
| 1,991,576 | A | * | 2/1935 | Remde | B66F 9/08 187/226 |

(Continued)

FOREIGN PATENT DOCUMENTS

| DE | 19956403 A1 | 6/2001 |
| EP | 1792868 A1 | 6/2007 |
| WO | WO00/30422 | 6/2000 |

OTHER PUBLICATIONS

Ebace Preview, Business Jet Interiors International, Mar. 2010, 2 pgs.

(Continued)

*Primary Examiner* — Minh Truong
(74) *Attorney, Agent, or Firm* — Egan Peterman Enders Huston

(57) ABSTRACT

Ground-accessing elevator systems and methods are provided for transporting personnel between the ground level and one or more decks of multi-level vehicle such as a fixed-wing aircraft. The vehicle elevator systems and methods may be implemented using a multi-track guide rail system configured to guide an elevator car between the ground and two or more levels within a vehicle. The multi-track guide rail system may include an intra-vehicle track fixed to the vehicle structure and configured to guide the elevator car between decks of the vehicle, and a separate deployment track may be configured to telescope downward from the intra-vehicle guide rail track to guide the elevator car during deployment to the ground from the vehicle.

32 Claims, 21 Drawing Sheets

(51) Int. Cl.
  *B66B 11/00* (2006.01)
  *B64C 1/22* (2006.01)
  *B66B 9/00* (2006.01)
  *B64C 1/14* (2006.01)
  *B64C 1/00* (2006.01)

(56) References Cited

U.S. PATENT DOCUMENTS

| | | | |
|---|---|---|---|
| 2,086,002 | A | 7/1937 | Shepard |
| 2,554,930 | A | 5/1951 | Ulinski |
| 3,341,034 | A | 9/1967 | Blasen |
| 3,861,542 | A | 1/1975 | Molter et al. |
| 3,934,681 | A | 1/1976 | Herrell |
| 4,046,226 | A * | 9/1977 | Flinchbaugh ........... B66B 9/083 187/202 |
| 4,262,777 | A | 4/1981 | Christopher |
| 4,375,876 | A * | 3/1983 | Stewart ................ B64C 1/1438 160/201 |
| 4,653,707 | A | 3/1987 | Hamilton et al. |
| 6,340,136 | B1 | 1/2002 | Luria |
| 6,776,263 | B2 | 8/2004 | Gottlieb et al. |
| 6,854,564 | B2 | 2/2005 | Reuter et al. |
| 7,159,821 | B2 | 1/2007 | Harrington et al. |
| 7,318,566 | B2 | 1/2008 | Hubenthal et al. |
| 7,549,514 | B2 | 6/2009 | Heggli et al. |
| 7,584,926 | B2 | 9/2009 | Harrington et al. |
| 8,602,169 | B2 | 12/2013 | Fairchild |
| 2002/0070080 | A1 | 6/2002 | Nakagaki et al. |
| 2003/0057031 | A1 | 3/2003 | Gottlieb et al. |
| 2011/0042168 | A1 | 2/2011 | Grundmann |
| 2011/0084172 | A1 | 4/2011 | Fairchild |
| 2011/0315822 | A1 * | 12/2011 | Fairchild ................ B60J 5/062 244/129.5 |
| 2012/0261511 | A1 | 10/2012 | Ehlert et al. |

OTHER PUBLICATIONS

Dee Howard Co., Illustrated Parts Catalog, Apr. 1989, 78 pgs.
International Search Report, PCT/US2011/001863/ Aug. 22, 2012, 3 pgs.

* cited by examiner

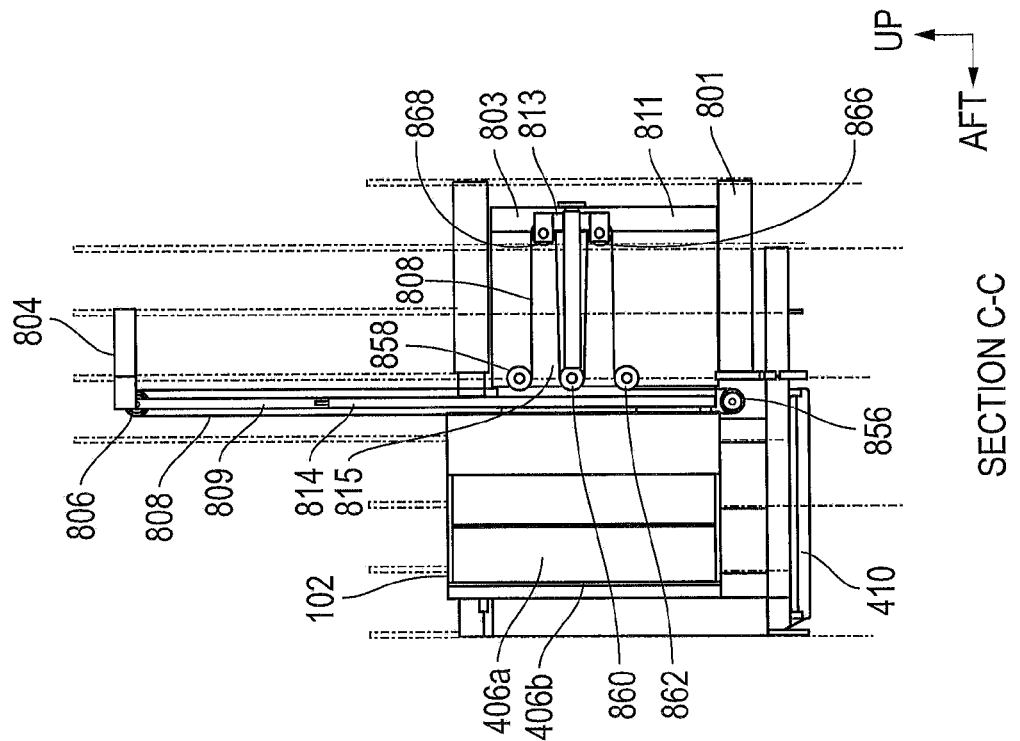
FIG. 6C  SECTION C-C
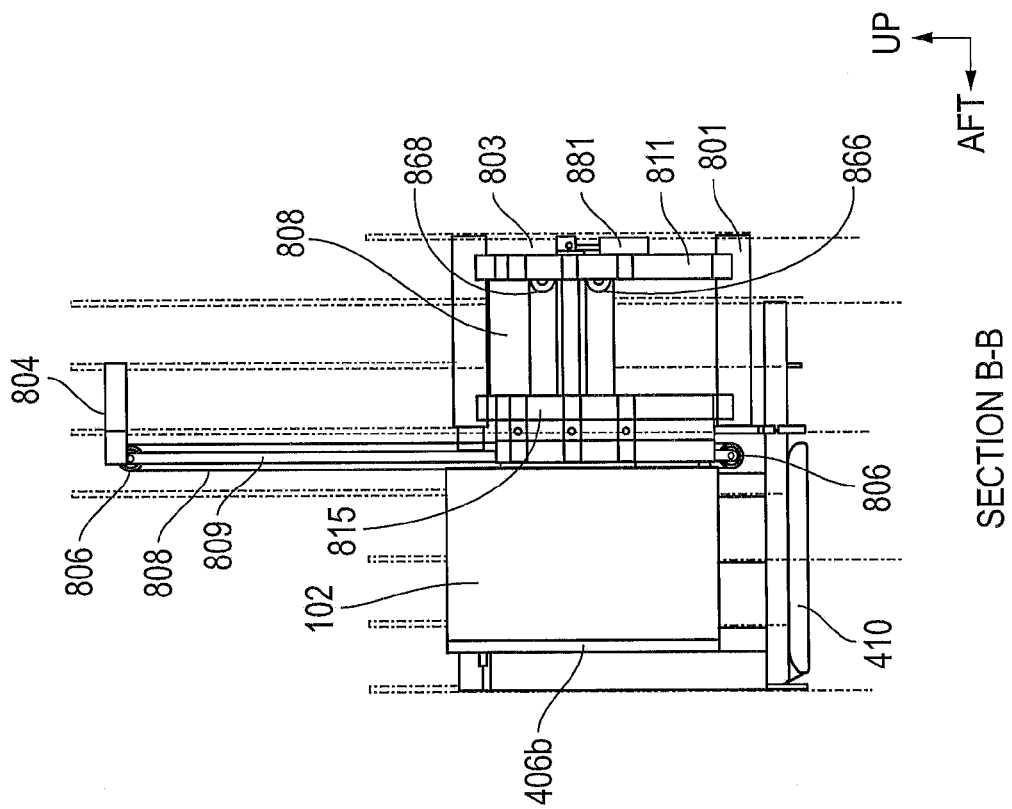
FIG. 6B  SECTION B-B

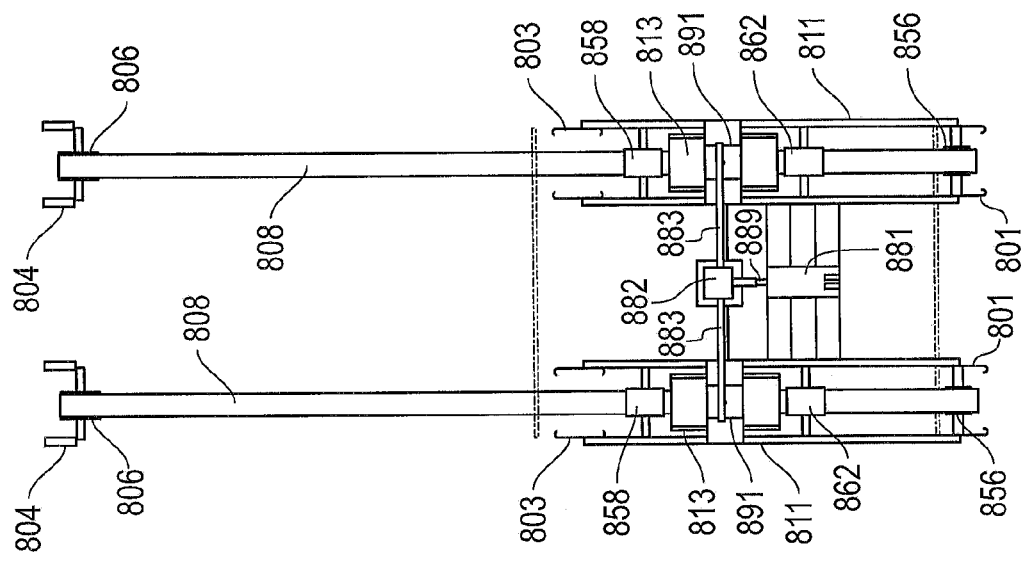
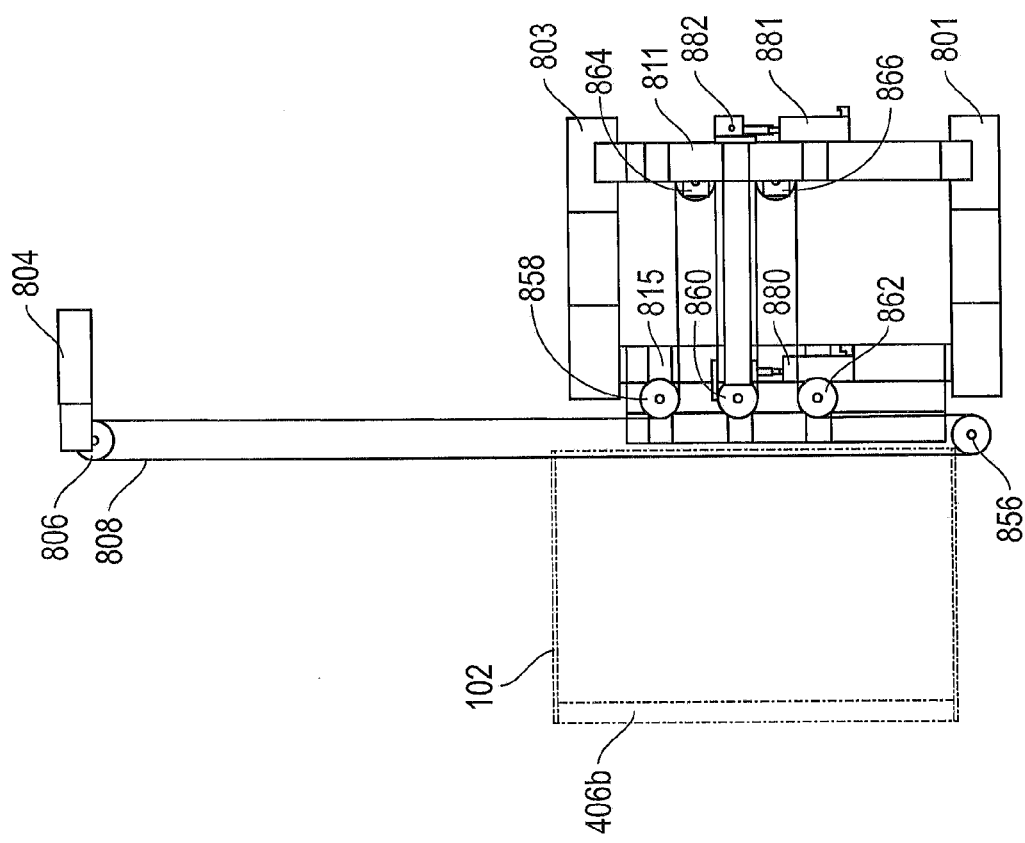

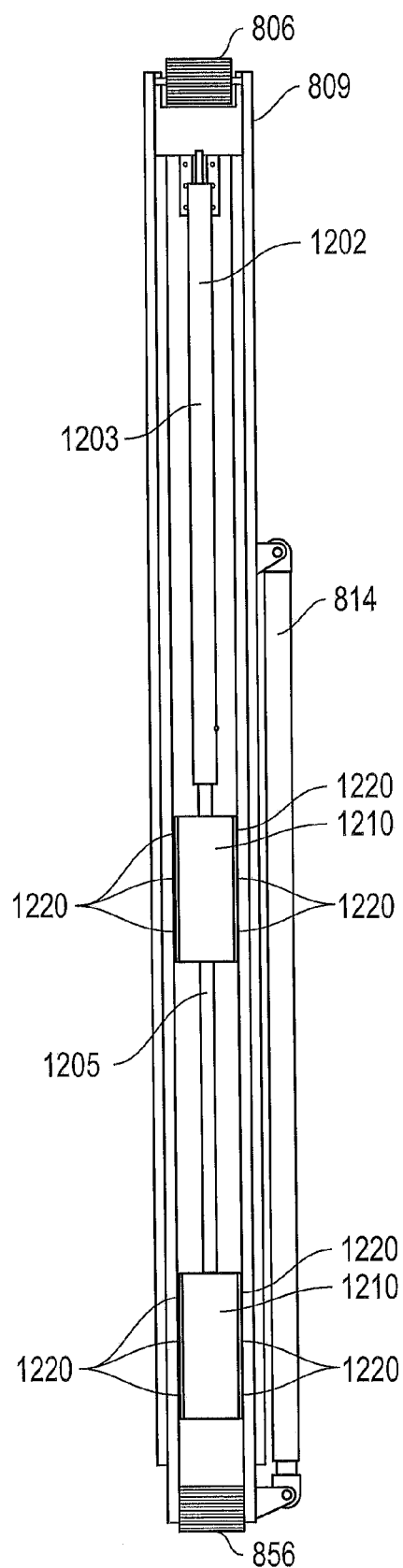
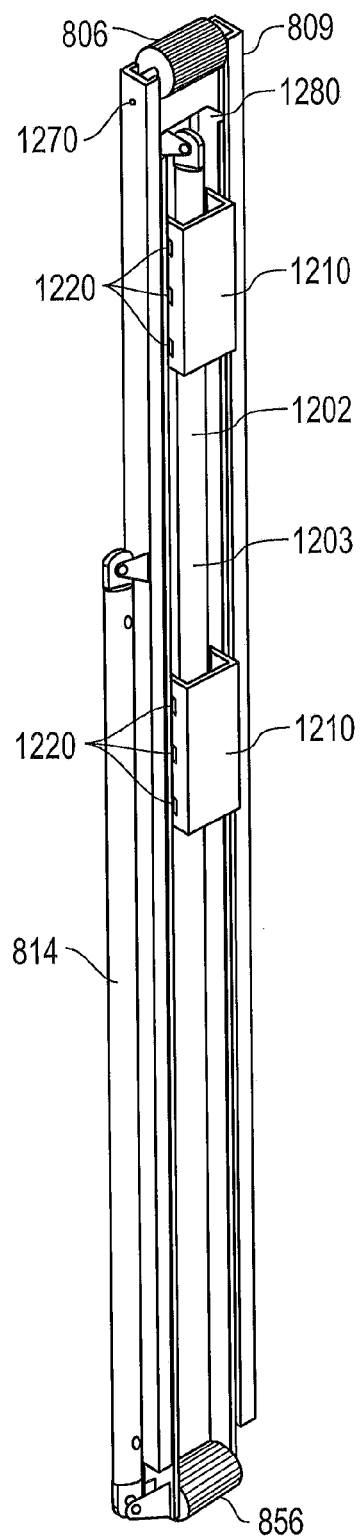
FIG. 8C
FIG. 8D

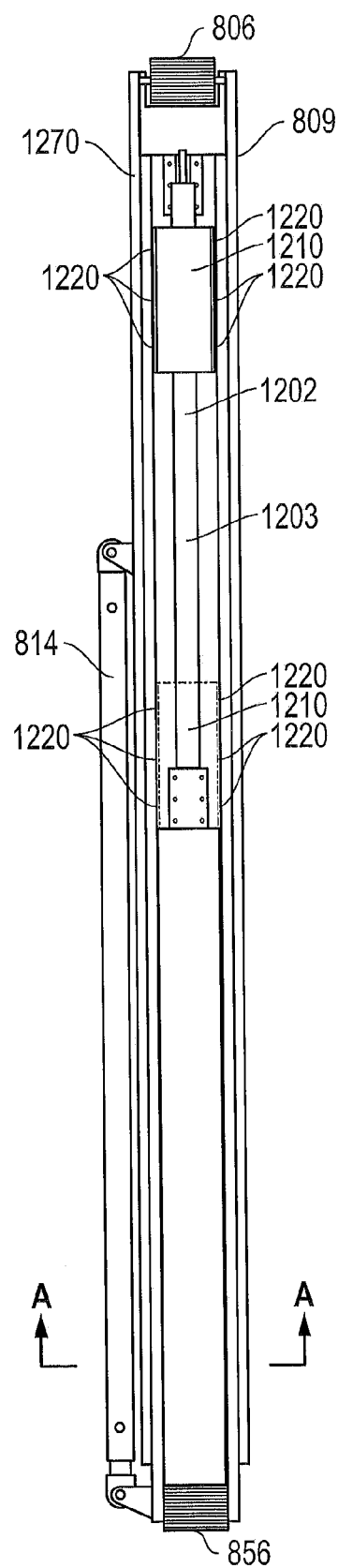
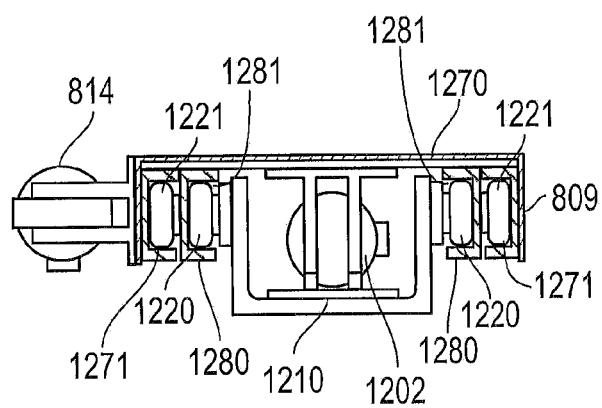
SECTION A-A
FIG. 8F
FIG. 8E

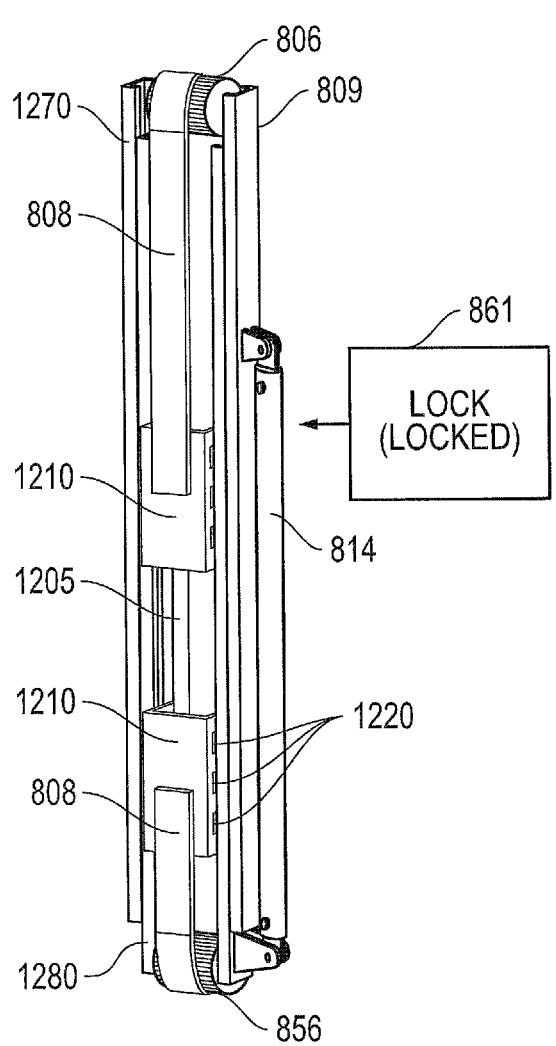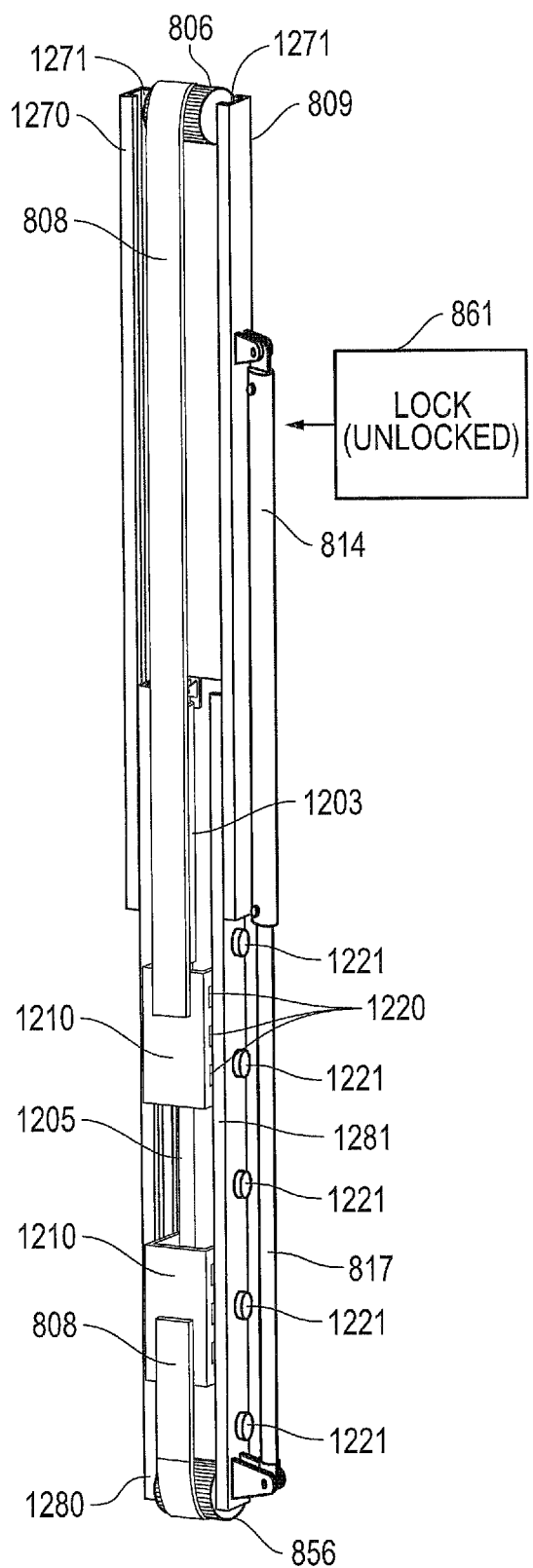
FIG. 8G
FIG. 8H

SECTIONS A-A AND E-E

SECTION A-A

VEHICLE ELEVATOR SYSTEMS AND METHODS

This application is a continuation of pending U.S. patent application Ser. No. 13/088,015, filed on Apr. 15, 2011 and entitled "Vehicle Elevator Systems And Methods", the entire disclosure of the foregoing application being incorporated herein by reference.

FIELD OF THE INVENTION

This invention relates generally to elevator systems, and more particularly to elevator systems for vehicles such as aircraft.

BACKGROUND OF THE INVENTION

Fixed wing aircraft are typically provided with side opening external passenger and cargo doors. The external doorways of most larger commercial fixed wing aircraft (e.g., such as Boeing 747, 757, 767, etc.) are sufficiently high off the ground such that external stairs, external elevator or Jetway is required for personnel (e.g., passengers and crew) access to and from the interior of the aircraft. Some passenger aircraft are provided with multiple levels such as a lower lobe and one or more passenger decks. Internal staircases between these multiple levels have often been provided to allow personnel to move between levels.

In the past, 747 aircraft have been equipped with elevators that work in flight to travel between levels within the fuselage. These prior in-flight elevators have a single hinged door opening and travel from the lower lobe to the upper deck, travel between the lower lobe and main deck, or travel between the main deck and upper deck of the 747. In one example of such elevators, the elevator car is moved up and down using a chain drive with fixed sprockets.

SUMMARY OF THE INVENTION

Disclosed herein are elevator systems and methods that may be provided for transporting personnel in safety and comfort between the ground level and one or more levels (e.g., main deck level and/or lower lobe) of a vehicle such as a fixed wing aircraft (e.g., wide-body fixed wing aircraft such as a Boeing 747-8 or Airbus A380). Although illustrated and discussed herein in relation to a fixed wing aircraft, it will be understood that the disclosed systems and methods may be similarly implemented with any other type of vehicle (e.g., rotary aircraft, space vehicle such as shuttle-type vehicle, large ground vehicle, etc.) having sufficient ground clearance between the body of the vehicle and the ground level to allow deployment of an elevator car between the vehicle and the ground. In this regard, the term "fuselage" is used herein with regard to exemplary aircraft applications, although the disclosed systems and methods may be similarly implemented with any body (e.g., cab, chassis or other type of partial or complete enclosure) of another type of vehicle that is suspended above the ground level.

In one embodiment, the disclosed elevator systems may be implemented to advantageously provide secure and convenient access to an aircraft or other vehicle interior from the ground for VIPs and heads of state or other personnel, and without the need for an external stair system to access the vehicle interior. In another embodiment, the same elevator system may be implemented to not only provide ground access when a vehicle is parked, but to also operate between levels during in-flight or other vehicle movement operations using the same elevator car in a manner that facilitates new opportunities such as for aircraft cabin layout and design. For example, taking advantage of these and other capabilities of the disclosed elevator systems in a fixed wing aircraft, new VIP space can be created by moving crew operations, galleys and/or storage areas to the lower lobe with access provided by the disclosed elevator systems. Thus, the disclosed systems and methods may be implemented to provide a high level of convenience, flexibility and functionality to an aircraft or other vehicle. Additionally, an aircraft or other vehicle may be configured with the disclosed elevator systems, either as part of a completion package or as a stand-alone modification (e.g., as a retrofit) to an existing aircraft or other type of vehicle.

In one embodiment, the disclosed vehicle elevator systems and methods may be implemented using a multi-track guide rail system configured to guide an elevator car between two or more levels (e.g., multiple decks) within an aircraft in order to provide access to the multiple levels. In one exemplary implementation, a multi-track guide rail system may include two separate tracks. These two separate tracks may include an intra-vehicle guide rail track (in this case an intra-aircraft guide rail track) and a deployment track for guiding a single elevator car between aircraft levels. In such an exemplary embodiment, the intra-aircraft track may be fixed to the aircraft structure and configured to guide the elevator car between levels within the aircraft (e.g., between main deck and lower lobe of a Boeing 747-8 aircraft) during an intra-aircraft elevator car movement phase. The separate deployment track may be configured to telescope downward from the intra-aircraft guide rail track with the elevator car during deployment to the ground through the fuselage skin of the aircraft during an elevator car deployment phase. An elevator system may be configured such that deployment to the ground level may be accomplished from either the main deck or lower lobe (e.g., cargo bay) levels of a two-level aircraft, and such that deployment of the elevator car to the ground level can also be accomplished from the ground level by the use of the external call panel (control panel) located on the fuselage near the fuselage door.

Advantageously, the separate deployment track may be mechanically and/or electrically locked in place during flight operations to prevent accidental attempted deployment of the elevator car outside the aircraft, e.g., during flight or movement on the ground. In a further embodiment, the deployment track may be specifically configured for anticipated ground conditions, e.g., to sustain high wind gusts (e.g., up to 60 mph) while the elevator car is deployed to the ground level.

In another embodiment, an elevator car lifting mechanism may be provided that includes one or more separate belt and pulley lifting systems, e.g., optionally using one or more drive belts having integral teeth dimensioned to mate in a cooperative manner with integral teeth of the pulleys of the elevator car lifting mechanism. Together with the multi-track guide rail system, one or more belt and pulley lifting systems may be implemented to provide a quiet and stable means for lifting or lowering and elevator car between levels during flight and while on the ground.

An elevator car lifting mechanism may be optionally provided with multiple and separate belt and pulley lifting systems for redundancy and/or for implementing separate elevator car movement functions. In this regard, each belt and pulley lifting system may be driven by drive system including one or more rotating actuators, e.g., electric motors, hydraulic motors, etc. In one exemplary embodiment, multiple redundant belt and pulley lifting systems (each employing a separate drive belt and corresponding pulleys for the drive belt) may be provided for together raising the elevator car from the ground, moving the elevator car between levels within the aircraft, and deploying the elevator car to the ground level. In such a dual-lifting system embodiment, both belt and pulley systems may be identical and each one of the belt and pulley systems may be configured to be itself fully capable of maintaining elevator car lift and motion in the event one fails. In one exemplary embodiment, deployment of the elevator car to the ground level may be accomplished by the movement of provided deployment idler pulleys via a ball screw drive that serves to loosen the drive belts allowing gravity to drop the deployment track and the elevator car via the deployment track.

In a further embodiment, secondary elevator car movement control mechanisms may be optionally employed (i.e., in addition to the a primary elevator car movement mechanism) to restrict the movement speed of the elevator car in the event of a free fall condition, e.g., such as in a case where the primary elevator car movement mechanism has lost lift support of the elevator car. Examples of such a secondary elevator car movement control mechanism include, but are not limited to, safety hydraulic cylinders which may be incorporated into one or both of the intra-aircraft guide rail and/or deployment track mechanisms. Such safety hydraulic cylinders may be provided with internal flow resistors which are configured to induce a hydraulic fluid flow resistance that is slightly greater than the maximum operating speeds of the elevator car in order to minimize or eliminate risk of injury to passengers in the event of a free fall event.

The disclosed ground-accessing elevator systems and methods may be paired with any type of fuselage door suitable for closing the opening in the fuselage through which the elevator car is deployed and recalled. Such a fuselage door may be employed to seal the elevator car opening in the fuselage during flight operations (e.g., to allow pressurization), or at other times when the elevator car is not deployed outside the aircraft. In one exemplary embodiment, a single fuselage door may be provided that opens on the inside of an aircraft (within the fuselage) so that the opened fuselage door is not visible from the exterior of the aircraft. In this particular embodiment, a fuselage door track system may be provided to guide the fuselage door between opened and closed positions, and a fuselage door drive actuator (e.g., electric or hydraulic motor) may be provided to move the fuselage door into opened position by lifting the fuselage door with cables. During the fuselage door opening process, the fuselage door is guided by fuselage door tracks as it is lifted to the upper side of the lower lobe area of the aircraft. To close the fuselage door, the fuselage fuselage door is dropped back down the fuselage door tracks into place (by virtue of gravity), locked, and sealed. Operation of the fuselage door may be disabled during flight and manual override capability may be provided for operating the fuselage door. An exterior control panel may be provided for controlling the fuselage door. The fuselage door may be configured to withstand internal aircraft pressurization as well as anticipated external ditching loads.

Using the disclosed systems and methods, elevator cars of different configurations and shapes (e.g., cylindrical or rectangular in shape) may be employed to transport people and/or items between the ground and one or more interior levels of an aircraft, or between multiple interior levels within an aircraft. The shape of the elevator car may be selected, for example, to match the style and atmosphere of the aircraft interior along with the desired exterior appearance when deployed to the ground level. For example, in one exemplary embodiment an elevator car may be provided that is dimensioned and configured to so transport up to four people, one person in a wheelchair with an attendant, or an attendant with a galley cart. An elevator car may include accessories such as interior side wall intercom, PA speaker, interior sidewall control panel including call/send switch (for elevator system function and floor selection), emergency chemical oxygen drop box, "Return to Seat" and "Use Oxygen" ordinance signs, recessed and/or decorative accent or wash lighting, lighting to provide pathway illumination for entrance and exit from the elevator car, etc. Weight sensors may be provided to stop the car when it is over loaded.

In such an embodiment, the elevator car may be provided with one or more door openings (e.g., two door openings) for access to multiple levels of the aircraft, and a given elevator car door may be located on any one or more of three sides of the elevator car, with the remaining fourth side being the side of the elevator car that is attached to the multi-track guide rail system. Emergency egress hatches (e.g., one located in the floor and the other located in the ceiling of the elevator car) may be optionally provided as desired to provide for the event in which a car stalls between two levels or the automated door assemblies become unable to operate. Manual overrides and operation controls, as well as other failsafe devices may be employed to help ensure the safe transport of personnel. For example, in the event of power loss the elevator car may be configured to remain stationary at its current position and a manual override system may be provided for safe operation and exiting of the elevator system. Examples of such manual override systems are linkages that may be accessed and turned by hand crank (or with the aid of a cordless drill generating appropriate torque) to overdrive the motors and ball screws and move the elevator car and/or elevator door in the event of a power loss or other failure. Examples of failsafe devices include, but are not limited to, one or more hydraulic cylinders (similar to shock absorbers) to limit the speed of movement of the elevator car, e.g., so as to prevent the elevator car from falling, e.g., if both drive belts were to break or in the event of other drive system failure. Mechanical stops may also be optionally installed on the tracks of the multi-track guide rail system to catch and/or hold the elevator car at a given position.

In one respect, disclosed herein is a ground-accessing vehicle elevator system, including: at least one multi-track guide rail assembly configured for installation between multiple levels of a vehicle, the multi-track guide rail assembly including an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track; and an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle. The deployment track may be configured to move from the retracted position to the extended position relative to the intra-vehicle guide rail track, and the elevator car may be configured to be deployed outside a body of the vehicle in engaged relationship either together with or after movement of the deployment track from the retracted position to the extended position. The elevator car may also be configured to be retracted into the body of the vehicle in engaged relationship either together with or before movement of the deployment track from the extended position to the retracted position, and the deployment track may also be configured to move from the extended position to the retracted position relative to the intra-vehicle guide rail track.

In another respect, disclosed herein is a multi-level vehicle equipped with a ground-accessing elevator system, the vehicle including: a vehicle body containing multiple levels therein; at least one multi-track guide rail assembly disposed between the multiple levels of the vehicle, the multi-track guide rail assembly including an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track; and an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle. The deployment track may be configured to move from the retracted position to the extended position relative to the intra-vehicle guide rail track, and the elevator car may be configured to be deployed outside a body of the vehicle in engaged relationship either together with or after movement of the deployment track from the retracted position to the extended position. The elevator car may also be configured to be retracted into the body of the vehicle in engaged relationship either together with or before movement of the deployment track from the extended position to the retracted position, and the deployment track may also be configured to move from the extended position to the retracted position relative to the intra-vehicle guide rail track.

In another respect, disclosed herein is a method for operating a ground-accessing elevator system for a multi-level vehicle, the vehicle including: providing a vehicle body containing multiple levels therein; providing at least one multi-track guide rail assembly disposed between the multiple levels of the vehicle, the multi-track guide rail assembly including an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track; providing an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle; moving the deployment track from the retracted position to the extended position relative to the intra-vehicle guide rail track, and moving the elevator car in engaged relationship with the deployment track to deploy the elevator car outside the body of the vehicle either together with or after moving the deployment track to the extended position; and moving the elevator car in engaged relationship with the deployment track to retract the elevator car into the body of the vehicle, and moving the deployment track from the extended position to the retracted position relative to the intra-vehicle guide rail track either together with or after retracting the elevator car into the body of the vehicle.

BRIEF DESCRIPTION OF THE DRAWINGS

FIGS. 6A-6C illustrate sectional views of the ground-accessing elevator system of FIG. 5.

FIGS. 6D-6E illustrate additional side and end views, respectively, of the ground-accessing elevator system of FIG. 5.

FIGS. 8A-8I illustrate side, perspective and end views of a multi-track guide rail assembly according to one exemplary embodiment of the disclosed systems and methods.

DESCRIPTION OF ILLUSTRATIVE EMBODIMENTS

Figure 1:
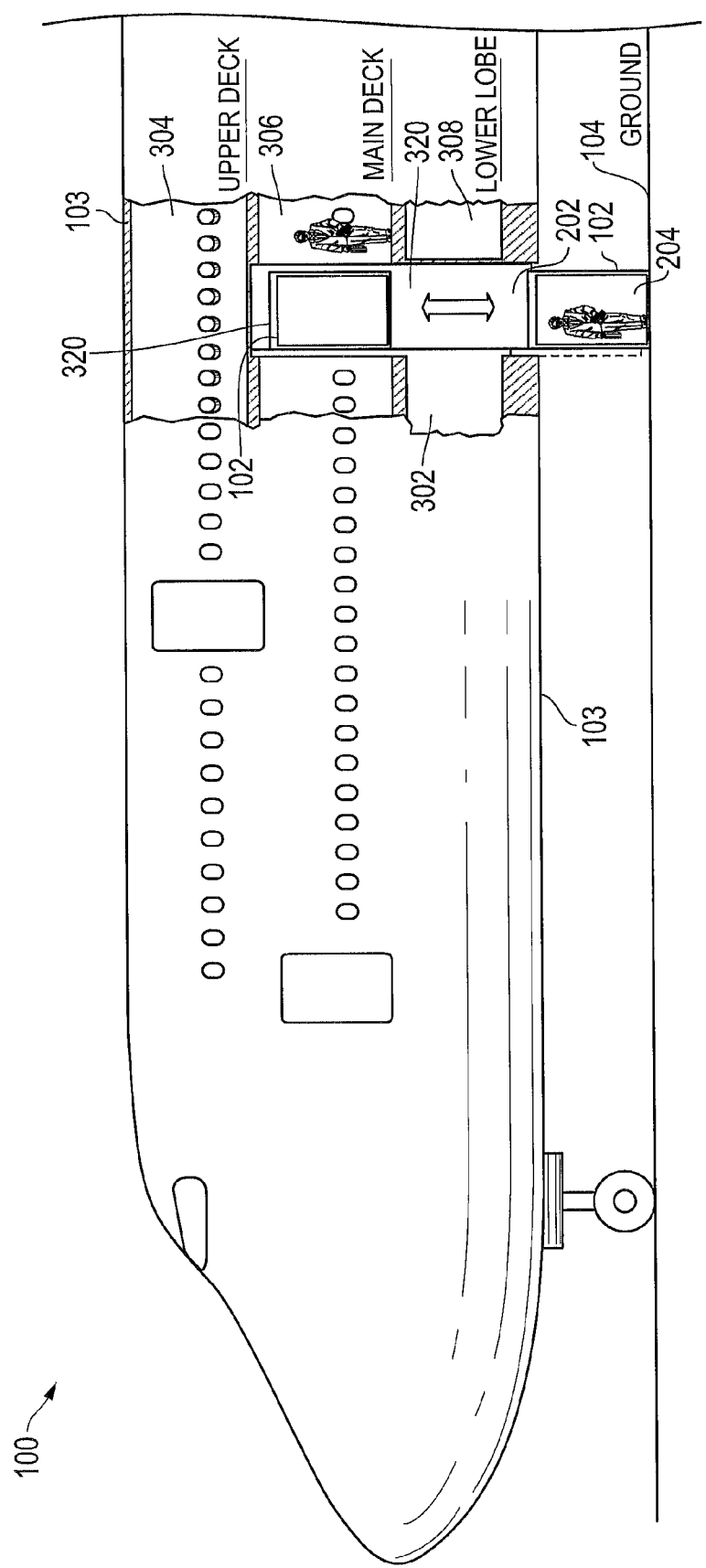
FIG. 1 illustrates a fixed wing passenger aircraft configured with a ground-accessing elevator system according to one exemplary embodiment of the disclosed systems and methods.

FIG. 1 illustrates a fixed wing wide-body passenger aircraft 100 configured with a ground-accessing elevator system according to one exemplary embodiment of the disclosed systems and methods. In the illustrated example, aircraft 100 is a three-level aircraft (such as Boeing 747-8 Intercontinental aircraft) having a lower lobe level 308, main deck level 306 and upper deck level 304, it being understood that this application is exemplary and illustrative only, and that the disclosed elevator systems and methods may be installed in any other type of wide-body or non-wide body fixed wing aircraft (e.g., passenger, military, cargo, etc.) or other type of vehicle having two or more levels and sufficient interior space and ground clearance for operation in a manner as described further herein. Examples of other types of wide body fixed wing aircraft include, but are not limited to, other Boeing 747 models, Airbus A380, McDonnell Douglas MD-11, etc., although as previously stated wide body fixed wing aircraft are not the only type of aircraft with which the disclosed systems and methods may be employed.

Figure 2:
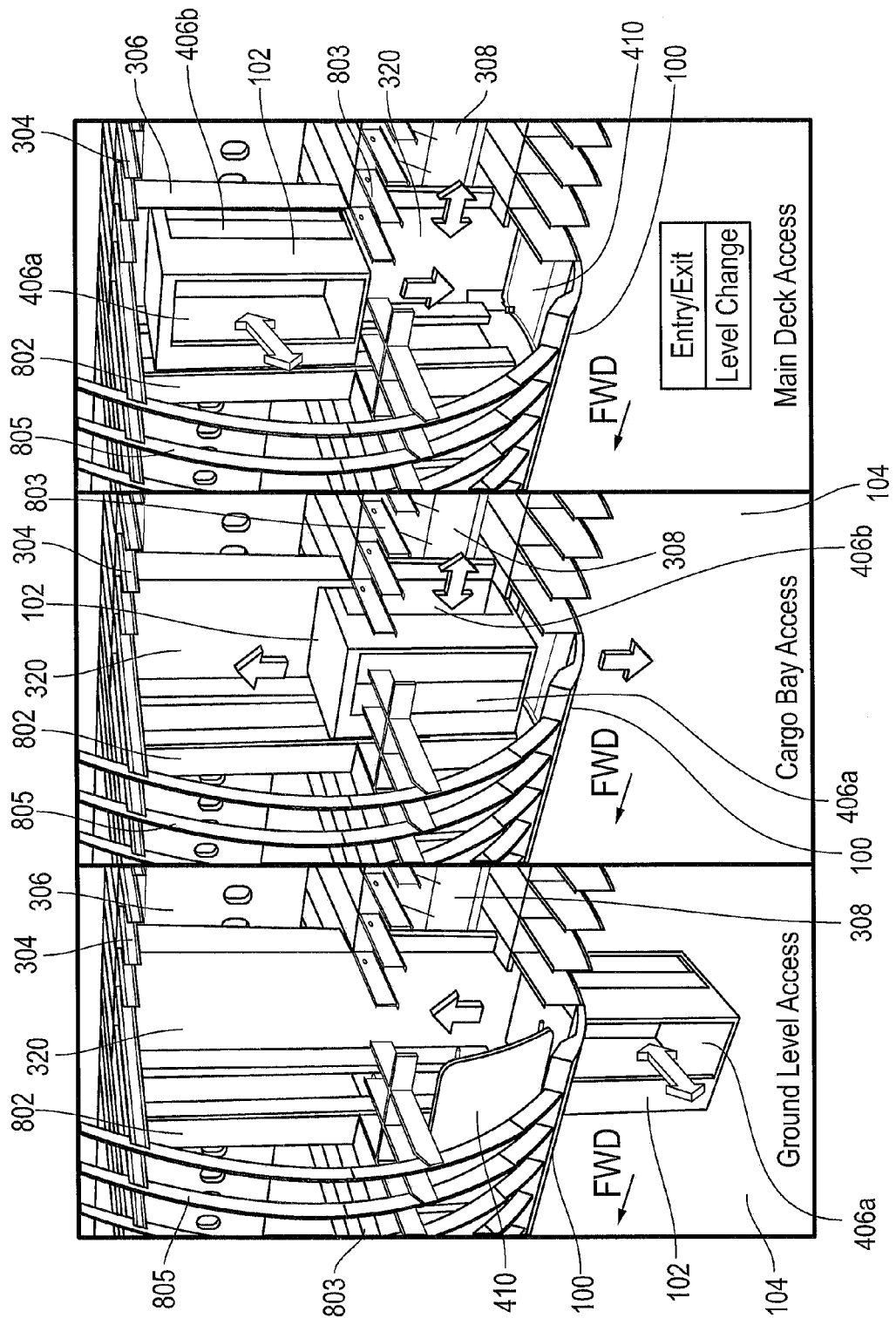
FIG. 2 illustrates partial cross-sectional perspective views of a fixed wing passenger aircraft configured with a ground-accessing elevator system according to one exemplary embodiment of the disclosed systems and methods.

As shown in FIGS. 1 and 2, an elevator shaft 320 is provided to extend between the main deck 306 through the lower lobe (cargo bay) 308 to an opening 202 defined in the underside of the fuselage fuselage skin 103 of aircraft 100. An elevator car 102 with a passenger/cargo enclosure 204 is provided within elevator shaft 320 and is configured to be raised and lowered by an elevator drive system 302 between positions adjacent main deck 306, lower lobe 308, and ground 104 as further shown and described in relation to FIG. 2. Elevator shaft 320 may be provided in one embodiment as a runway system that encloses and isolates illustrated components of the elevator system on each level (e.g., from the lower lobe and the main deck areas) with partitions, closeout panels and runway door assemblies that provide access and operate in conjunction with the elevator car door assemblies 406 of elevator car 102. In such an embodiment, the runway system of the elevator shaft 320 may be configured to conceal the elevator system components from the view of the aircraft interior. The runway may be provided with call/send switches and related control panels that are configured to initiate operation of the elevator car 102.

In the embodiment of FIGS. 1 and 2, the elevator system may be configured to provide a safe and reliable system for transporting personnel and/or equipment between the main deck 306, lower lobe 308 and the ground level 104, providing access from the ground level 104 to each of the lower lobe (cargo bay) 308 and main deck level 306. It will be understood that in other embodiments the disclosed elevator systems may be alternatively configured to extend between the ground level 104 and a single aircraft level (e.g., lower lobe 308 only), between the ground level 104 and three or more aircraft levels (e.g., lower lobe 308, main deck 306 and upper deck 304), etc.

FIG. 2 further illustrates fuselage door 410 that seals the elevator car opening 202 during flight operations (e.g., to allow pressurization), or at other times when the elevator car 102 is not deployed outside the aircraft 100. As shown in FIG. 2, fuselage door 410 may be opened to allow elevator car 102 to be deployed through opening 202 for ground level access. When fuselage door 410 is closed, elevator car 102 may be deployed in lower lobe access and main deck access positions as shown. As further shown in FIG. 2, separate elevator car door assemblies 406 may be optionally provided on different sides of elevator car 102, e.g., as automated (electrically operated) low profile sliding pocket doors on any two sides of the elevator car 102 that minimize impact on the floor plan and interference issues. Thus, in the illustrated embodiment, a port-side facing elevator car door assembly 406a and an aft facing elevator car door assembly 406b are shown. Such a configuration may be desirable, for example, when the different deck areas of an aircraft have layouts (e.g., structural features) that require access to the elevator car interior 204 from different respective sides of the elevator car 102. In this regard, elevator car door assemblies 406 may be provided on any one or more sides of the elevator car 102 that do not interfere with position of elevator drive system 302 and multi-track guide rail assemblies 809, which will be described and illustrated further herein. For example, FIG. 2 illustrates use of a port facing elevator car door assembly 406a to access ground level 104 and main deck level 306, and use of port facing elevator car door assembly 406b to access lower lobe 308.

In one exemplary embodiment, the main deck portion of an elevator shaft runway system may consist of honeycomb structural panels located between the main deck 306 and upper deck 304. An automated runway door may be installed and operated in conjunction with the automated elevator car door assembly 406 of the elevator car 102. The runway system may be configured to provide mounting surfaces for interior components such as decorative panels, artwork and lights. The lower lobe portion of the elevator shaft runway system may be constructed of honeycomb structural panels and/or gill liner type materials between the lower lobe 308 and main deck 306. A closed-off area may be provided to enclose the fuselage door 410 and its related door mechanism. Access panels or doors may be installed as necessary for maintenance purposes.

Any suitable type of elevator car door assembly may be provided for selectively preventing egress from elevator car interior 204 and ingress to interior 204 when the elevator car 102 is in motion (e.g. conventional telescope-style sliding elevator car doors, outwardly-hinged elevator car doors, etc.). Moreover, an additional elevator car door assembly may be provided at each level within the aircraft to prevent accidental access to the elevator shaft when the elevator car is at another level. It will be understood that although an elevator car 102 having a square-shaped cross section is described and illustrated herein, any other suitable cross-sectional elevator car shape is possible (e.g., circular, oval, triangular, rectangular, etc.). In one embodiment elevator car 102 may be configured to operate in a manner similar to a residential or commercial building elevator car.

In one embodiment, the disclosed elevator systems may be implemented in a multi-level aircraft, such as a Boeing 747 or Airbus A380, to provide in-flight access to the lower lobe 308 (including forward cargo bay area of the lower lobe 308). This capability enables in-flight access to traditional cargo space of the lower lobe 308 as further described below. All or a portion of this cargo area space may be configured as additional floor space for alternative use (e.g., personnel use) depending on use and need for cargo containers.

Figure 3:
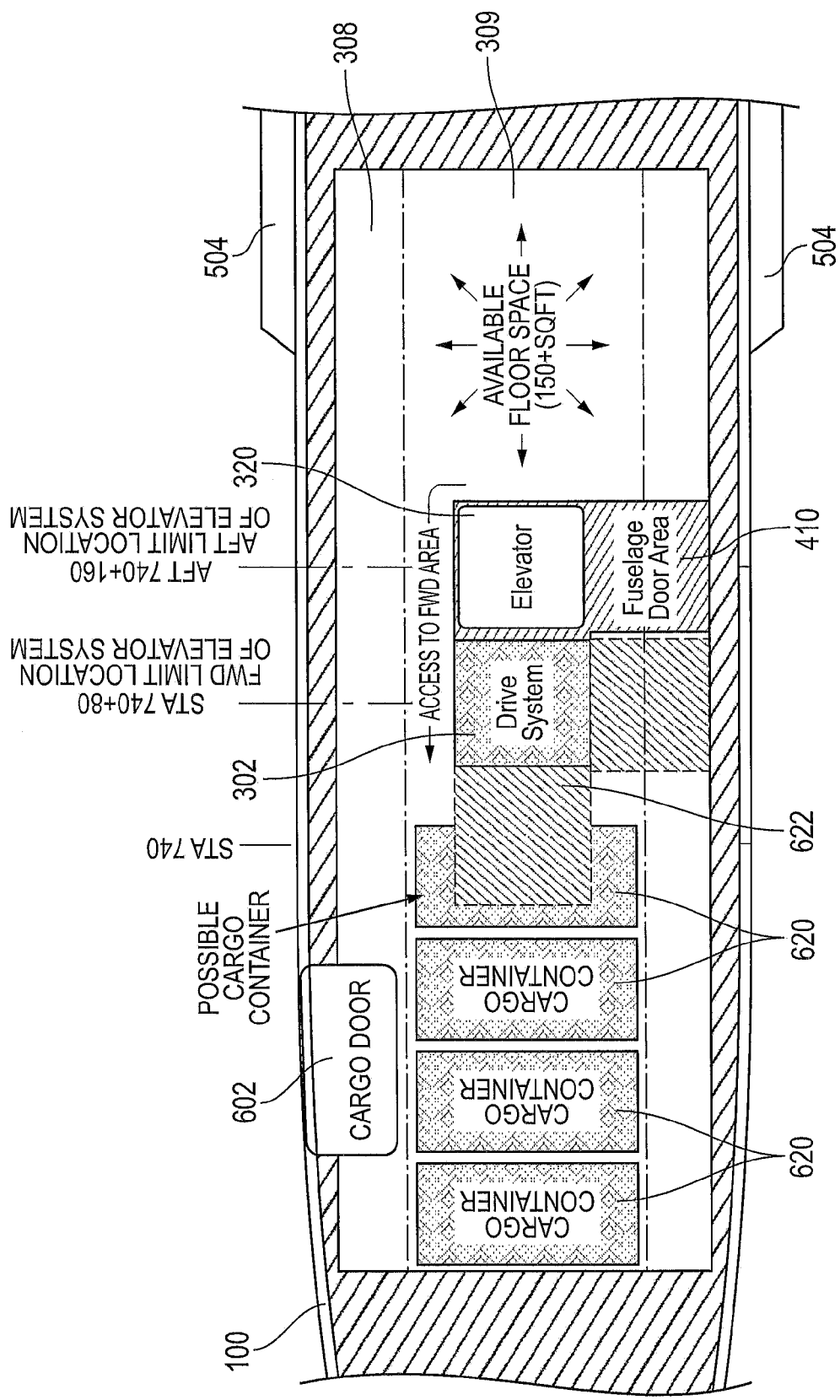
FIG. 3 illustrates a partial cross-sectional overhead view of a fixed wing passenger aircraft configured with a ground-accessing elevator system according to one exemplary embodiment of the disclosed systems and methods.

For example, FIG. 3 illustrates an overhead view of the layout of lower lobe 308 of a 747-8 aircraft equipped with a ground-accessing elevator system and fuselage door assembly according to one embodiment of the disclosed systems and methods. As shown in FIG. 3, the general location of the elevator system is on the centerline of the aircraft fuselage 100, e.g., near the door 2 entryway to the main deck 306 just forward of the upper deck stairway that extends between the main deck 306 and the upper deck 304. Such a particular location is exemplary only, but may be selected based on parameters such as typical traffic patterns, VVIP interior floor plan space, and modification to aircraft primary structure for one particular 747-8 aircraft configuration. It will be understood that this location of the elevator system of this embodiment may be varied in a 747-8 aircraft, for example, 80 inches longitudinally from STA 740+80 to STA 740+160 to provide flexibility in location that gives adaptability to many different existing interior 747-8 floor plan configurations and in turn to allow additional flexibility in the development of new 747-8 floor plans themselves.

As shown, the ground-accessing elevator system of FIG. 3 has an elevator shaft 320 positioned such that entry from the elevator car 102 to the main deck 306 is located near door 2 of main deck 306 forward of the wing roots 504 and the stairs from main deck 306 to the upper deck 304, and aft of cargo door 602. In this position, the elevator system may also be configured to also provide access to additional floor space 309 aft of elevator shaft 320 and to the lower lobe area forward of elevator shaft 320 which may be used to transport cargo containers 620 and/or for uses such as an optional galley, crew rest area, passenger rest area, or special storage area 622 as shown. By implementing galley and/or other functions in the lower lobe area accessed by elevator car 102, additional VVIP floor plan space may be advantageously provided on the main deck.

In this exemplary embodiment, the elevator drive system 302 is located in the lower lobe 308 immediately adjacent and forward of elevator shaft 320, although in other embodiments it is possible that the elevator drive may be disposed in other positions relative to the elevator shaft 320 (e.g., aft of elevator shaft 320) and/or on other levels of the aircraft. Access to the forward cargo bay area of lower lobe 308 from elevator car 102 may be provided as shown through space on the starboard side of the elevator shaft 320, while fuselage door 410 and its actuation mechanism occupies space on the port side of elevator shaft 320. An elevator system control panel may be located within the elevator car, and elevator call panels located on the main deck and lower lobe areas. A secured elevator control panel (e.g., disposed behind a lockable and flush mounted door) may also be provided on the exterior of the fuselage for access from the exterior of the aircraft for operation of the elevator system while on the ground (e.g., to control calling the elevator car 102 to the ground level 104, to control raising and lowering the elevator car 102 to and from the aircraft, to control opening and closing the elevator car door assembly, etc.) and/or dispatching the elevator car).

Figure 4:
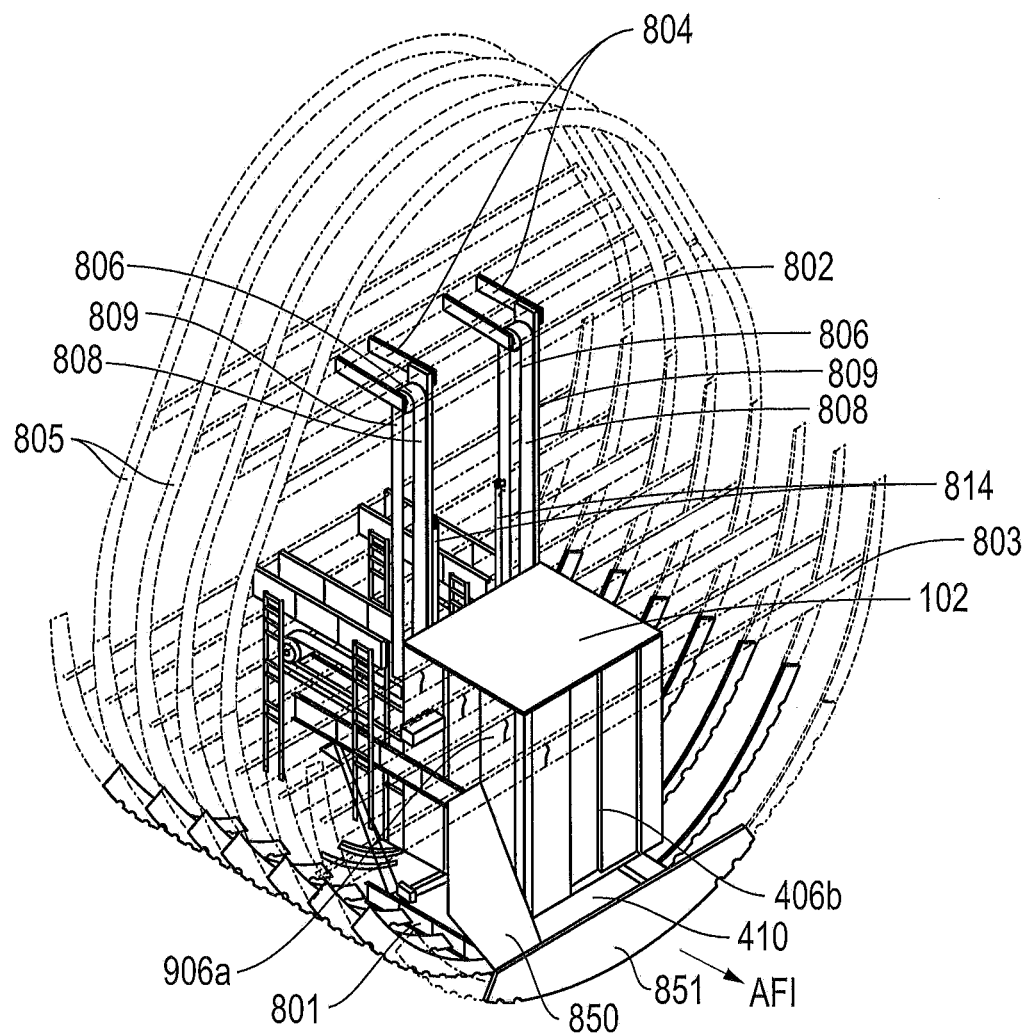
FIG. 4 illustrates a partial cross-sectional perspective view of a ground-accessing elevator system configured for a fixed wing passenger aircraft according to one exemplary embodiment of the disclosed systems and methods.
Figure 5:
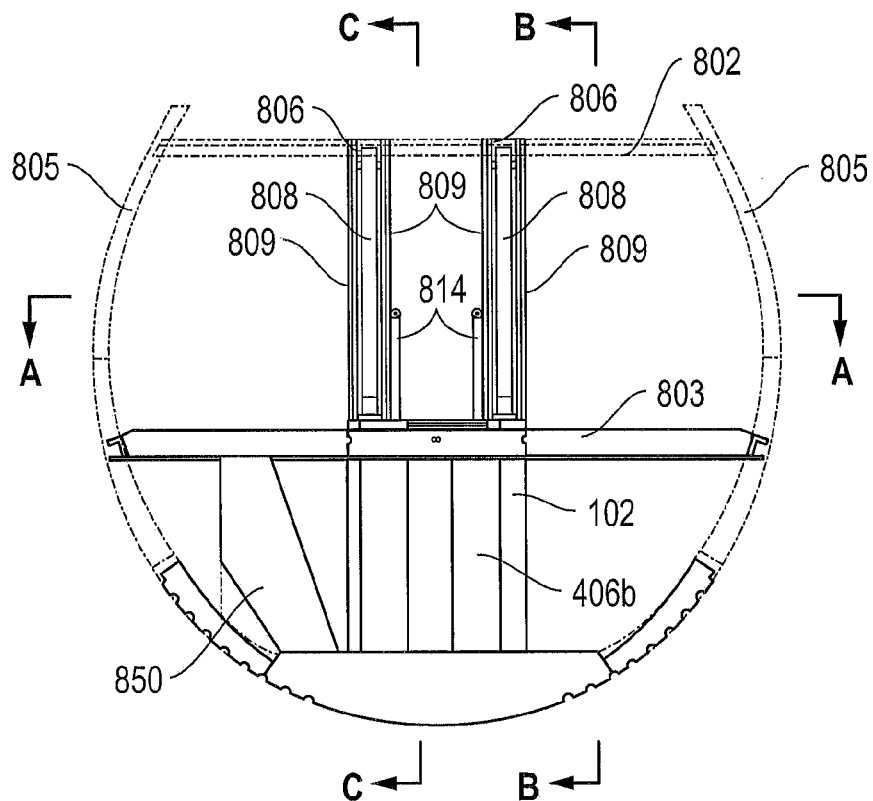
FIG. 5 illustrates a partial cross-sectional view of a ground-accessing elevator system configured for a fixed wing passenger aircraft according to one exemplary embodiment of the disclosed systems and methods.
Figure 6A:
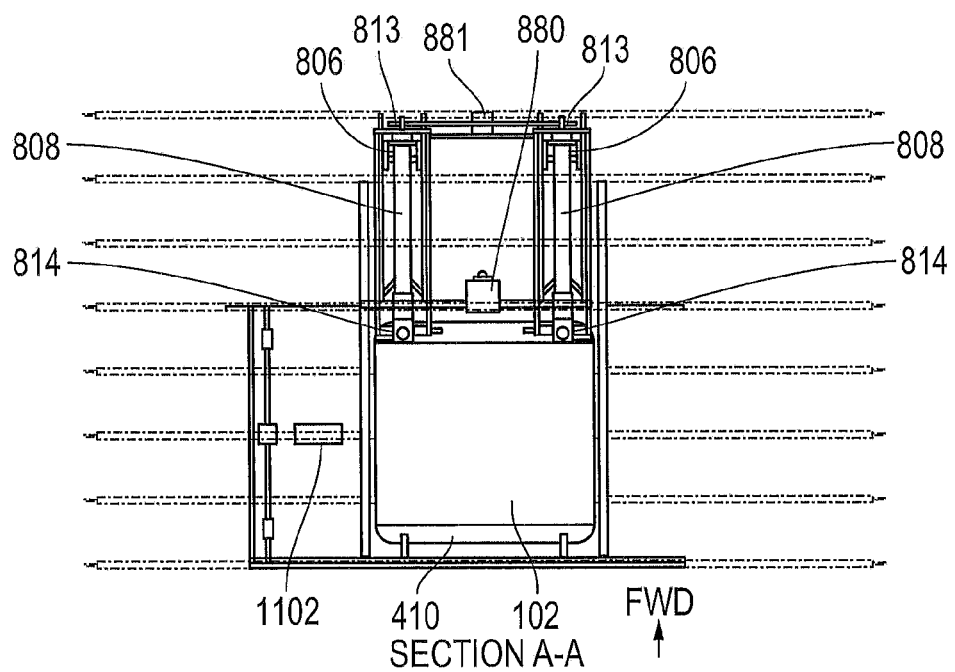

FIGS. 4-5 and 6A-6E illustrate different views of one exemplary embodiment of ground-accessing elevator system as it may be disposed within a 747-8 aircraft 100 in a position similar to that illustrated and described in relation to FIG. 3. In particular, FIG. 4 illustrates aircraft 100 with fuselage skin removed to show frames 805 and other structural members such as main deck floor support beams 803 and upper deck floor support beams 802 to which the elevator system is mounted. The elevator system includes a drive and guide rail system that lifts and lowers the elevator car 102 between the main deck 306, lower lobe 308, and ground level 104. In this exemplary embodiment, the drive and guide rail system is located on the forward side of the elevator car 102 and elevator shaft 320 but as previously described, may be alternatively installed on the aft side of elevator car 102 and elevator shaft 320 to allow for other optional positions of elevator car door assemblies 406 on elevator car 102. The drive system 302 may be mounted to structure of aircraft 100 in any suitable manner but in one embodiment is supported by primary structure and main deck floor structure 803 by support components 811 and 815 as further shown herein.

The multi-track guide rail system includes multi-track guide rail assemblies 809 that are coupled to vertically extend from upper deck floor supports 804 to lower lobe (cargo bay) floor support beams 801. Each of multi-track guide rail assemblies 809 is also coupled to main deck floor support beams 803 in addition to upper deck floor supports 804 and lower lobe (cargo bay) floor support beams 801. In this manner, multi-track guide rail assemblies 809 are configured to provide a secure and stable support structure for transporting the elevator car 102 between levels 306 and 308 within the aircraft. As will be further described, each of the multi-track guide rail assemblies 809 are also configured with a movable deployment track that retractably extends downward through elevator car opening 202 in the bottom of the aircraft fuselage to lower and support the elevator car 102 during deployment of the car 102 to the ground level 104.

As illustrated in FIGS. 4-5 and 6A-6E, the upper end of each of multi-track guide rail assemblies 809 is coupled to upper deck floor supports 804 and includes an upper guide rail assembly pulley 806 that is also coupled in fixed relationship to the aircraft structure (e.g., in this case the upper deck floor supports 804). Each of the multi-track guide rail assemblies 809 is also coupled to and supported by main deck floor structure 803 and the lower end of each of multi-track guide rail assemblies 809 is coupled to lower lobe floor support beams 801. The lower end of each of multi-track guide rail assemblies 809 includes a lower guide rail assembly pulley 856 that is coupled to the lower end of a deployment track 1280 that will be described and illustrated further herein. In one exemplary embodiment for an elevator car 102 configured for transporting four persons, multi-track guide rail assemblies 809 may be configured to support the weight of the elevator car plus a content load of approximately 800 pounds.

In the illustrated embodiment, each serpentine synchronized drive belt 808 forms a part of a respective belt and pulley lifting system that is coupled to drive system 302. Each drive belt 808 extends as shown between respective pulleys 806 and 856 and is fixedly coupled to one side of elevator car 102 by track mounted support guide mechanisms 1210 that are free to travel vertically up and down within a deployment track 1280 (which is itself slidably disposed within an intra-aircraft guide rail track 1270) of each of multi-track guide rail assemblies 809 as will be described further herein. In this embodiment, elevator drive system 302 actuates to move each of drive belts 808 up and down in tandem between each pair of pulleys 806 and 856 to transport elevator car 102 up and down between the main deck 306 and the lower lobe 308 as illustrated in FIG. 2.

As further illustrated in FIGS. 4-5 and 6A-6E, each belt and pulley lifting system also includes two sets of drive system pulleys 858, 868, 860, 866 and 862 that are positioned laterally to the side of the portion of drive belt 808 that extends between upper and lower pulleys 806 and 856. As shown, each set of drive system pulleys 858, 868, 860, 866 and 862 is aligned with a respective pair of guide rail assembly pulleys 806 so as to allow a corresponding one of the two drive belts 808 to wind in sequential manner around drive system pulleys 858, 868, 860, 866 and 862 between a corresponding pair of upper and lower guide rail assembly pulleys 806 and 856, respectively. One or more of drive system pulleys 858, 868, 860, 866 and 862 of each belt and pulley lifting system may be coupled to one or more rotating actuators 880 of drive system 302 (e.g., electric motors, hydraulic motors, etc.) that are configured to independently drive the respective belt 808 of the given belt and pulley lifting system to raise and lower elevator car 102 between main deck 306 and lower lobe 308 within elevator shaft 320 (e.g., in the embodiment of FIG. 6D, actuator 880 is coupled to rotate each drive system pulley 860 as a drive sprocket in order to drive each respective belt 808). As it is so raised and lowered, elevator car 102 is guided within elevator shaft 320 by track mounted support guide mechanisms 1210 slidably received in the deployment track 1280 of each of multi-track guide rail assemblies 809 which are described further herein. It will be understood that drive system 302 may include any suitable combination of drive mechanism components (e.g., motors, gear train, etc.) for independently driving each respective belt 808 of the separate belt and pulley lifting systems.

Also illustrated in the embodiment of FIGS. 6A-6E are support structure components 811 and 815 that support components of drive system 302, including the pulleys, actuators 880 and 881 and deployment idler pulley carriages 813. Operation of deployment idler pulley carriages 813 and their actuator 881 will be further described herein in relation to FIGS. 13A-13D. As will be further explained, each carriage 813 is laterally moveable by actuator 881 (via threaded shaft 885 and internally threaded ball component 882) in the direction of elevator car 102 and the portion of the drive belts 808 extending in linear operative engaged relationship between the respective upper guide rail assembly pulleys 806 and lower guide rail assembly pulleys 856 so as to selectively position each deployment carriage 813 and its deployment idler pulleys closer and further away from the portion of the drive belts 808 extending in linear operative engaged relationship between the respective upper guide rail assembly pulleys 806 and lower guide rail assembly pulleys 856. This movement of carriages 813 causes movement of unlocked deployment track 1280 relative to intra-aircraft guide rail track 1270 that will also be described and illustrated further herein.

It will be understood that drive belt 808 may be any type and size of belt suitable for raising, lower, and supporting elevator car 102 in the manner described herein. In one exemplary embodiment, drive belt 808 may be configured similar to a timing belt, i.e., having teeth that mate with corresponding teeth of pulleys 806, 858, 868, 860, 866 and 862 in a manner that prevents slipping and efficiently transfer power from drive system 302. Examples of suitable drive belt types include, but are not limited to, a reinforced low stretch toothed belt such as a Goodyear Eagle NRG or Acculiner polyurethane belt. Pulleys may be of any suitable type, and in one embodiment may be commercial off the shelf conveyor system pulleys. However, it will be understood that any other type of belt and/or number of belt and pulley systems suitable for raising and lower elevator car 102 within elevator shaft 320 between levels of aircraft 100 may be employed in other embodiments. Furthermore, any other type and/or configuration of lifting mechanism may be employed that is suitable for raising and lower elevator car 102 between levels of aircraft 100 within elevator shaft 320, e.g., chain drive, hydraulic cylinder drive, etc.

Figure 7A:
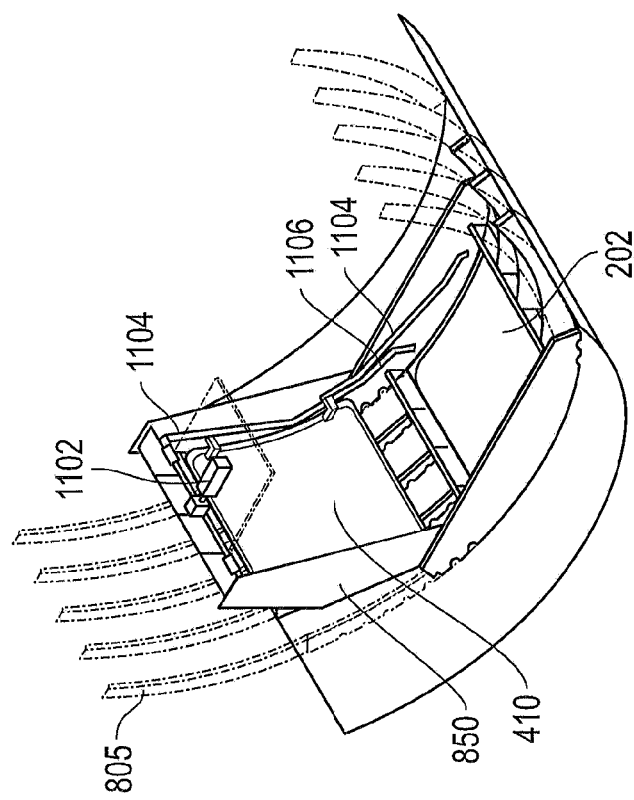
FIGS. 7A-7B illustrates a fuselage door assembly according to one exemplary embodiment of the disclosed systems and methods.
Figure 7B:
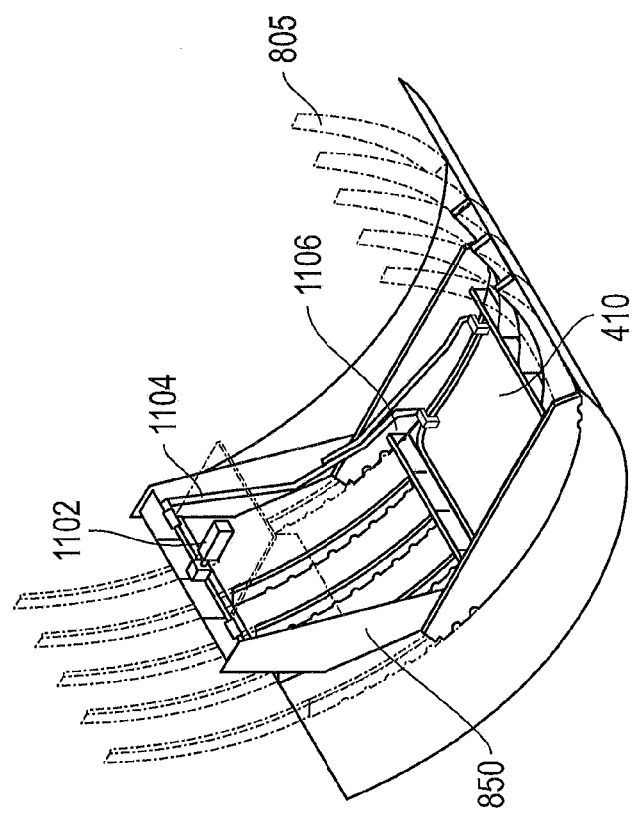

FIGS. 7A-7B illustrate one exemplary embodiment of a fuselage door assembly 850 that may be employed to seal elevator opening 202 that is defined in the fuselage skin of aircraft 100. As illustrated in FIGS. 7A-7B, fuselage door 410 travels on fuselage door tracks 1104 and 1106 from closed position (illustrated in FIG. 7A) and open position (illustrated in FIG. 7B). In this embodiment fuselage door tracks (outer track 1104 and inner track 1106) are of the C-channel type and are configured such that fuselage door 410 moves between the closed and open positions with sufficient clearance beneath elevator car 102 when it is in its lowermost position opposite lower lobe 308. A track fuselage door motor 1102 may be provided for actuating movement of fuselage door 410 between open and closed positions, although manual override mechanism/s may be provided to close and lock the fuselage door 410 in event of a power failure. Fuselage door 410 and opening 202 may be configured with suitable sealing mechanisms such that during flight fuselage door 410 may be secured to form a seal that contains air pressurization within the fuselage of aircraft 100 when fuselage door 410 is in closed position of FIG. 7A.

During normal operations, fuselage door 410 is typically moved to open position of FIG. 7B to allow elevator car deployment to ground level 104 only when aircraft 100 is parked on the ground with engines off. In the event of power loss, manual override mechanisms may be provided to close and lock the door.

FIGS. 8A-8I illustrates different views of multi-track guide rail assemblies 809 (without showing elevator car 102) as they may be implemented in one exemplary embodiment. As shown in the Figures, each multi-track guide rail assembly 809 includes multiple telescoping tracks, i.e., intra-aircraft guide rail track 1270 and deployment track 1280. Each deployment track 1280 is nested and slidably received via rollers 1221 within opposing interior side channels 1271 of a corresponding intra-aircraft guide rail track 1270 of the same guide rail assembly 809 as shown. Guide mechanisms in the form of two support guides 1210 (upper and lower) which are fixedly coupled between (and fixedly coupled to) drive belt 808 and elevator car 102 are in turn each slidably received via rollers 1220 within the deployment track 1280 of each multi-track guide rail assembly 809.

Figure 8A:
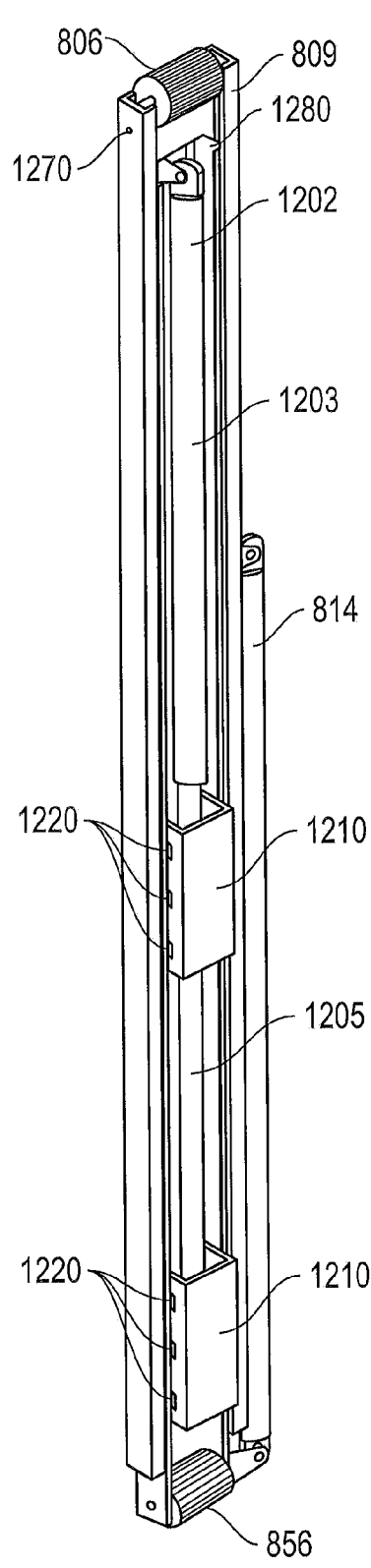
Figure 8B:
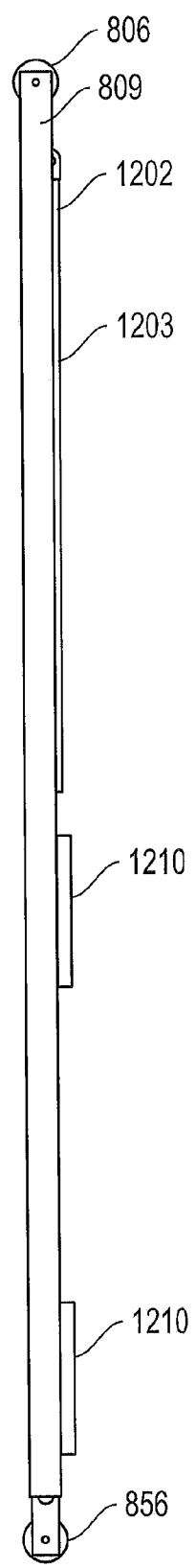
Figure 9A:
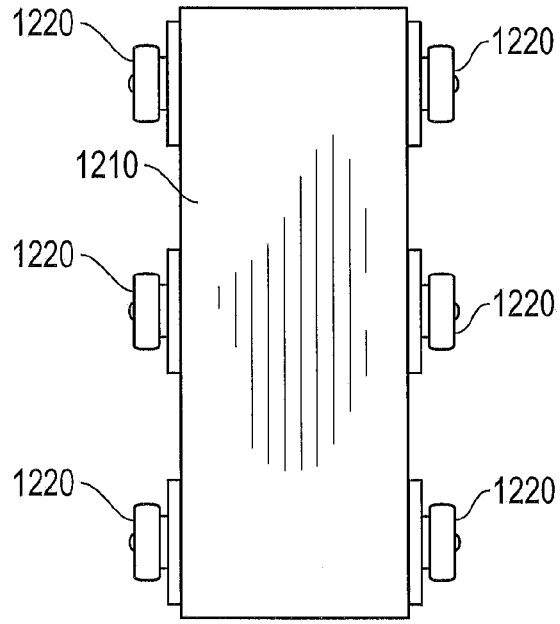
FIGS. 9A-9C illustrates side, perspective and end views of a support guide according to one exemplary embodiment of the disclosed systems and methods.
Figure 9B:
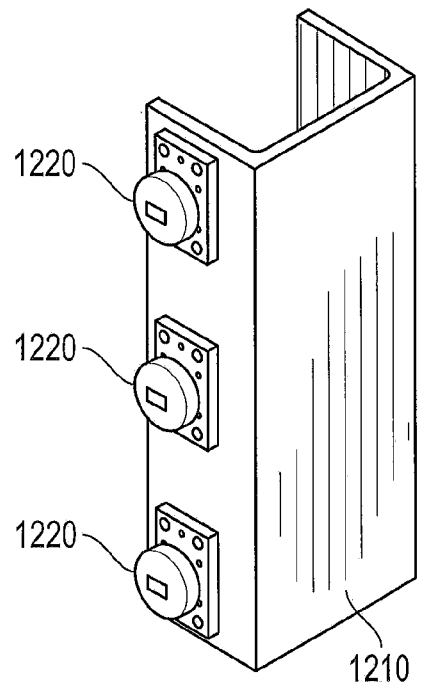
Figure 9C:
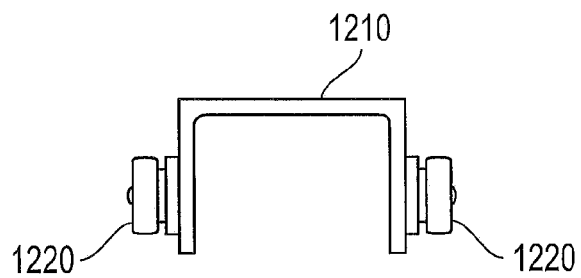

FIGS. 9A-9C provide more detailed views of a support guide 1210 and its rollers 1220, while FIG. 8F illustrates a cross-sectional view of a support guide 1210 in assembled relationship with other components of a multi-track guide rail assembly 809. As shown in FIG. 8F, outside rollers 1220 of support guide 1210 are received within opposing interior side channels of deployment track 1280 in such a way that support guide 1210 can freely travel on rollers 1220 within deployment track 1280, while at the same time supporting an attached elevator car 102 in cantilevered relationship to guide rail assembly 809. It will be understood that the particular number of support guides 1210 in this embodiment are exemplary only, and that any number and/or configuration of one or more support guides may be coupled between a guide rail assembly 809 and an elevator car 102.

Still referring to FIG. 8F, outside rollers 1221 of deployment track 1280 are received within opposing interior side channels of intra-aircraft guide rail track 1270 in such a way that deployment track 1280 can freely travel within intra-aircraft guide rail track 1270, while at the same time supporting attached support guides 1210 and an attached elevator car 102 in cantilevered relationship to guide rail assembly 809. As will be described further herein, deployment track 1280 may be locked in fixed relationship to intra-aircraft guide rail track 1270 during in flight operations, while at the same time support guides 1210 are free to travel up and down within the interior side channels 1281 of deployment track 1280 between upper and lower pulleys 806 and 856. When deployment track 1280 is so locked in position within intra-aircraft guide rail track 1270, elevator car 102 is free to move up and down between lower lobe 308 and main deck 306, but cannot be deployed through fuselage opening 202 to ground level 104. This capability may be exploited, for example, to ensure that no accidental attempted deployment of elevator car 102 outside the fuselage occurs during flight operations.

Figure 10A:
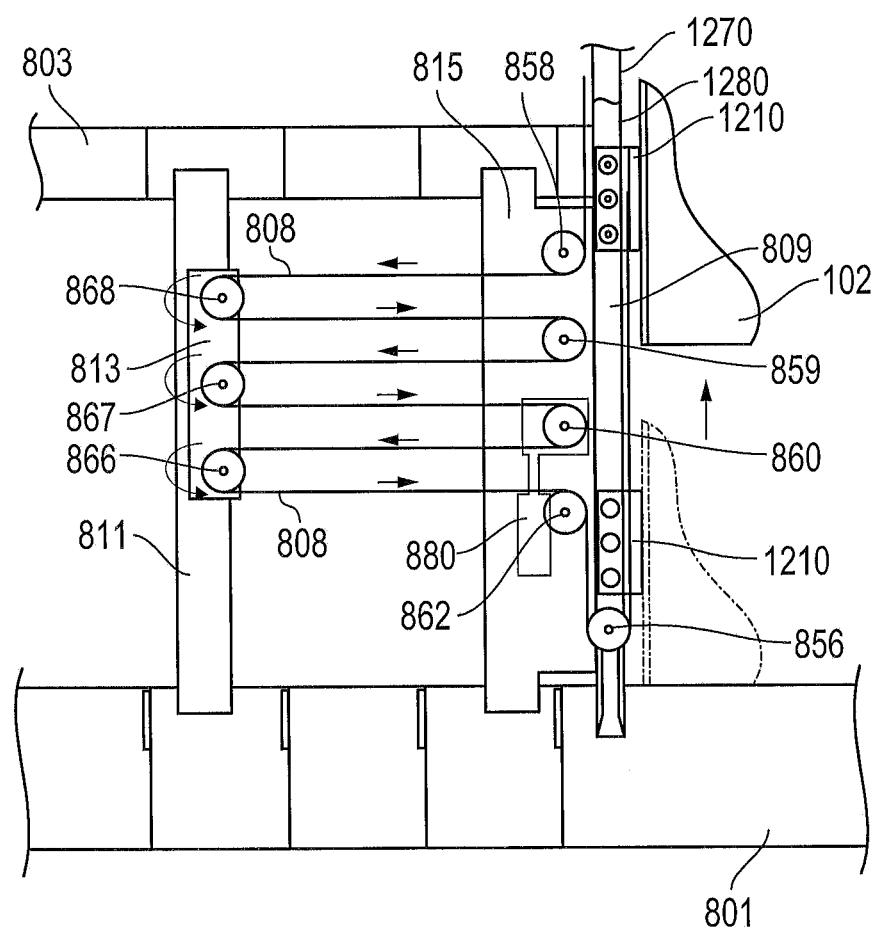
FIGS. 10A-10D illustrate side cross-sectional views of the operation of a ground-accessing elevator system configured for a fixed wing passenger aircraft according to one exemplary embodiment of the disclosed systems and methods.
Figure 10B:
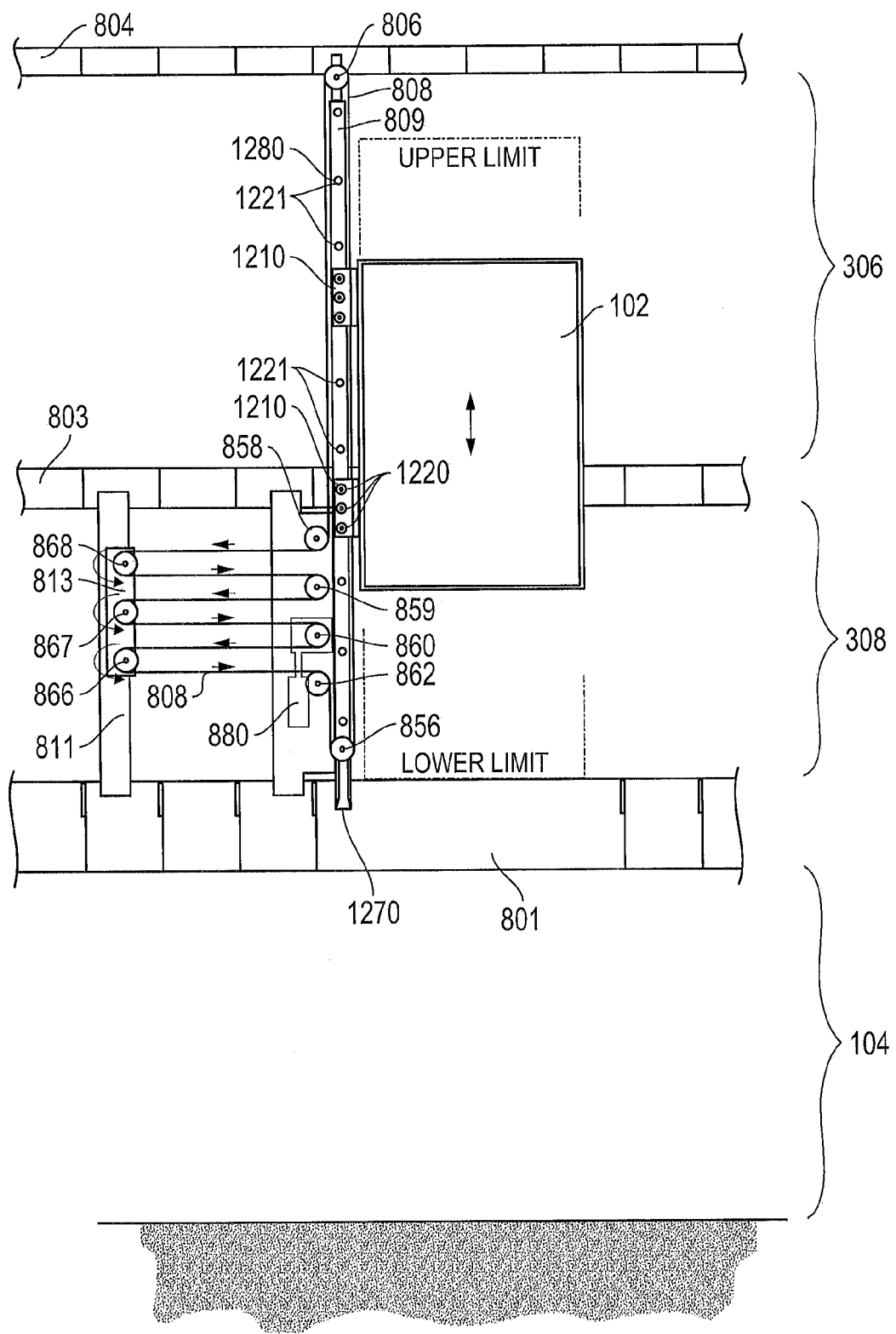

FIGS. 10A-10D illustrate another exemplary embodiment in which two additional drive system pulleys 859 and 867 are employed, it being understood that the number of drive system pulleys may be varied as needed or desired. FIGS. 10A-10B also illustrate intra-aircraft movement of elevator car 102, and FIGS. 10C-10D also illustrate deployment of elevator car 102 outside the fuselage of aircraft 100 to ground level 104. As shown in FIGS. 10A-10B, deployment track 1280 is held in a retracted position by the position of moveable deployment idler pulley carriages 813, which are each positioned at a first point that is farther away relative to the multi-track guide rail assemblies 809 such that each drive belt 808 is in tension. Deployment track may be locked in this retracted position during flight operations by, for example, a retractable pin/s in order to prevent attempted extension of deployment track (e.g., one or more mechanical or electro-mechanical locks 861 much like a deadbolt for a door may be, for example, integrated with a locking mechanism of fuselage door 410 and only unlocked when the locking mechanism of fuselage door 410 is unlocked). As shown by the arrows in FIGS. 10A-10B, elevator car 102 is moved up and down with deployment track retracted between main deck 306 and lower lobe 308 by the belts 808 of the belt and pulley lifting system that is coupled to drive system 302.

Figure 8I:
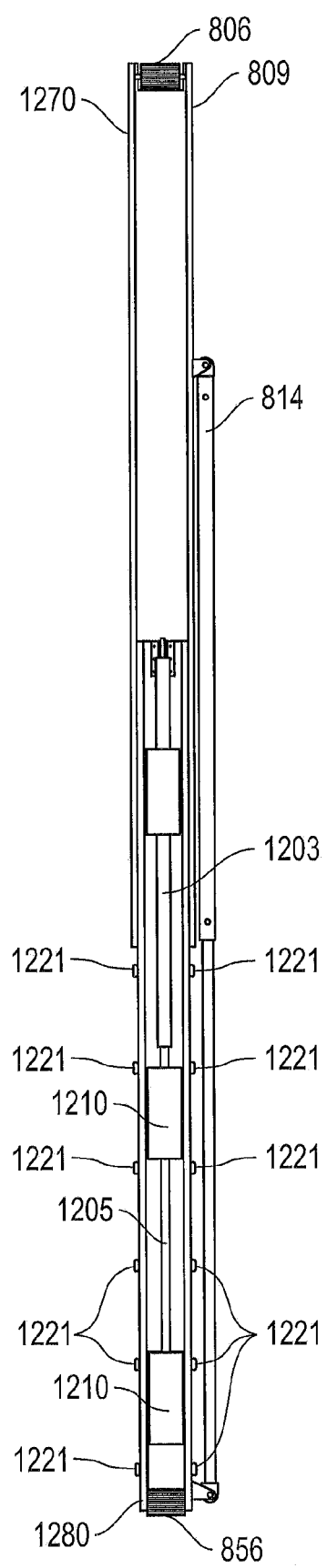
Figure 10C:
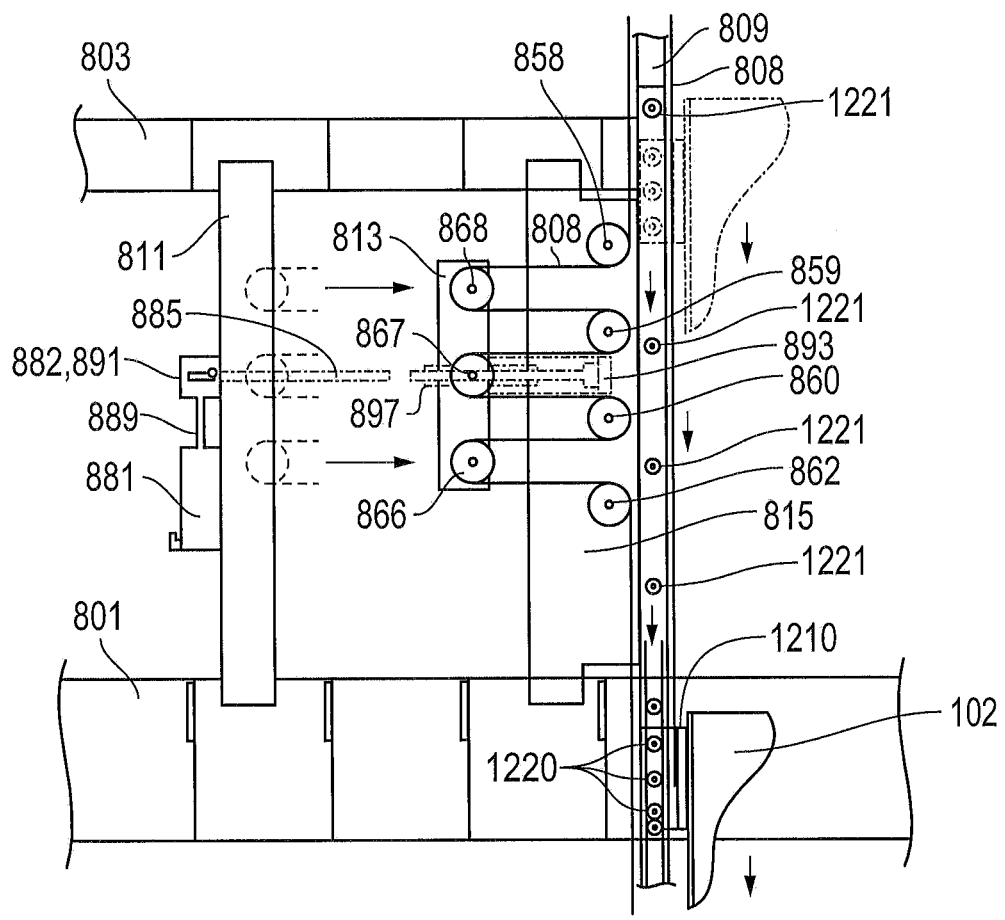
Figure 10D:
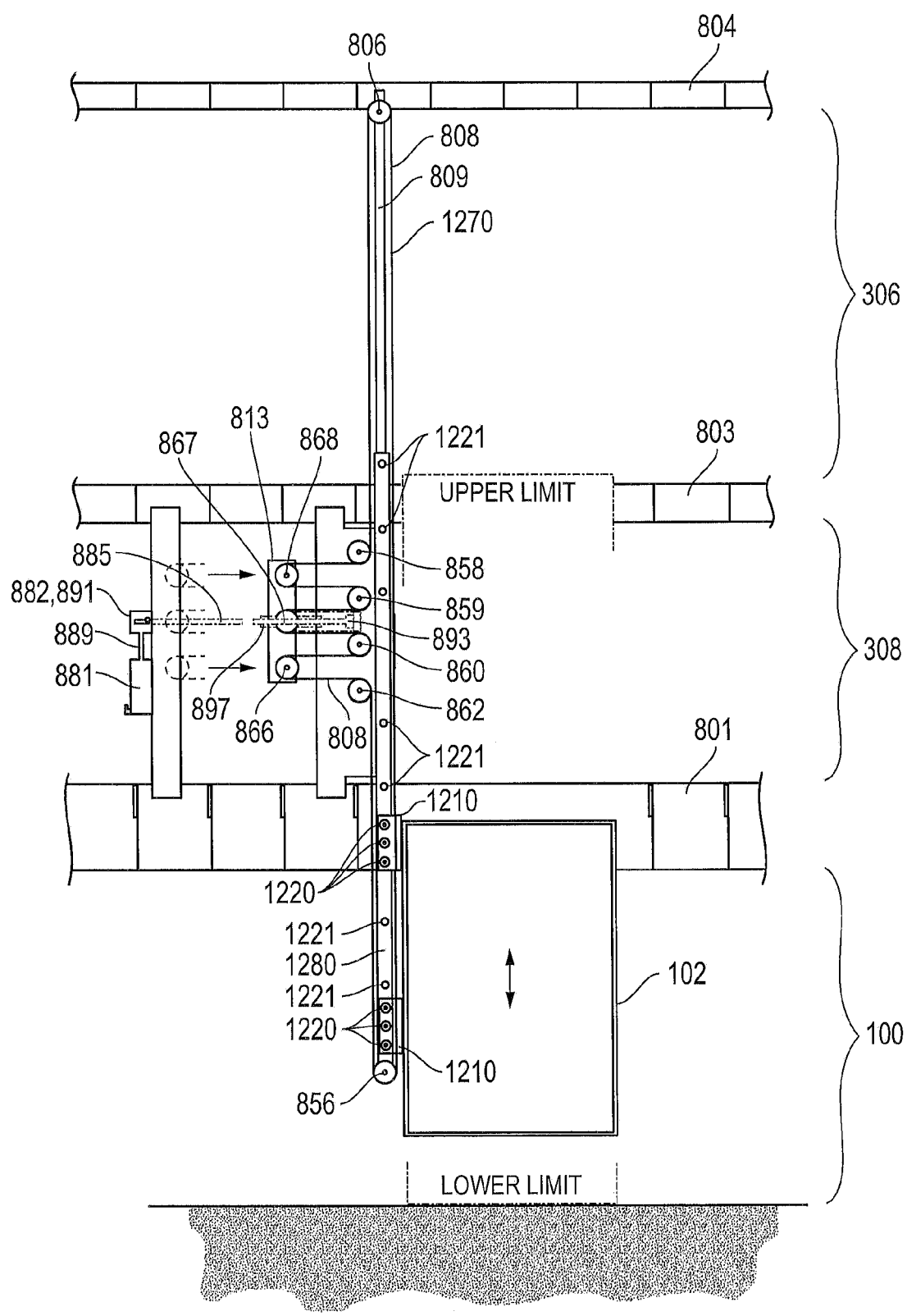

In FIGS. 10C-10D, deployment track 1280 has been extended by virtue of the lateral movement of deployment idler pulley carriages 813 in the direction of the arrows to a second point that is positioned closer relative to the multi-track guide rail assemblies 809. To lower elevator car 102 from aircraft 100, deployment track 1280 is first unlocked from fixed engagement with intra-aircraft guide rail track 1270 so that deployment track 1280 is free to move up and down within the interior side channels of intra-aircraft guide rail track 1270. Drive belts 808 are then loosened by movement of the deployment carriages 813 closer to the multi-track guide rail assemblies 809 to allow the portion of the drive belts 808 that extend linearly between the respective upper guide rail assembly pulleys 806 and lower guide rail assembly pulleys 856 to lengthen to allow deployment track 1280 to extend (e.g., by virtue of gravity) downward from intra-aircraft guide track 1270. FIG. 8G illustrates a view of a multi-track guide rail assembly 809 and drive belt 808 with deployment track 1280 in retracted position. FIGS. 8H and 8I illustrate views of a multi-track guide rail assembly 809 with deployment track 1280 in an extended position. Belt 808 is removed from the view of FIG. 8I.

Once unlocked, the deployment track 1280 and elevator car 102 may be extended and retracted together or simultaneously (i.e., at the same time and with each other) using actuator 881 to move carriages 813 toward and away from, respectively, the multi-track guide rail assemblies 809 so as to move personnel back and forth between aircraft 100 and ground level 104 as shown by the arrows. To later retract deployment track 1280 and elevator car 102 together or simultaneously (i.e., at the same time and with each other) back into the fuselage, drive belts 808 are tightened by movement of the deployment carriages 813 farther away from the multi-track guide rail assemblies 809 to shorten the portion of the drive belts 808 that extend linearly between the respective upper guide rail assembly pulleys 806 and lower guide rail assembly pulleys 856 to pull and retract deployment track 1280 and elevator car 102 together upward into intra-aircraft guide track 1270 to the lower lobe 308. Thus, it is noted that in one exemplary embodiment, the deployment track 1280 telescopes down and up as elevator car 102 moves such that elevator car 102 will always extend below or be positioned even with the bottom of the deployment track 1280. In this exemplary embodiment, the deployment track 1280 does not stay extended to the ground level 104 as the elevator car 102 moves back up into aircraft 100, but rather moves upward with the elevator car 102 such that it remains above or even (flush) with the bottom of elevator car 102.

In FIG. 10D, the "Upper Limit" and "Lower Limit" notations represent the upper and lower limits of the elevator car 102 when moved together with deployment track 1280 in the elevator car deployment phase using actuator 881 to move the idler pulley carriages to loosen the drive belts 808. Movement of elevator car 102 above the "Upper Limit" is accomplished using actuator 880 and rotating drive system pulley 860 to drive belt 808 in the intra-aircraft elevator car movement phase for movement of the elevator car 102 between aircraft levels.

It will be understood that elevator car 102 and deployment track 1280 may be configured to be moved between aircraft 100 and ground level 104 in any other suitable manner. For example, in another exemplary embodiment deployment track 1280 may be first extended without elevator car 102 and locked in extended downward position, e.g., using actuator 881 to loosen drive belts 808 by moving carriages 813 closer to the multi-track guide rail assemblies 809 while elevator car 102 is held stationary within aircraft 100. In such an alternate case elevator car 102 may be locked or otherwise supported in place within aircraft 100 while the deployment track 1280 is extended from aircraft 100 and then locked in place, after which elevator car 102 may be lowered using actuator 880, drive system pulley 860 and drive belt 808. Then actuator 880 may then be employed to rotate drive system pulley 860 to drive belt 808 to move elevator car 102 up and down in relation to the stationary deployment track 1280 between lower lobe 308 and ground level 104 while deployment track 1280 remains locked in downward extended position. In yet another alternative embodiment, deployment track 1280 and elevator car 102 may be extended together as described before (e.g., using actuator 881 to move carriages 813) and then deployment track 1280 locked in extended downward position, after which elevator car 102 may be moved up and down between aircraft 100 and ground level 104, e.g., using actuator 880 to drive belt 808.

It will be understood that in yet another exemplary embodiment the operational relationship of track 1270, track 1280 and/or support guides 1210 may be further optionally configured in any manner suitable allowing support guides 1210 to transition back and forth between travel within interior side channels 1281 of deployment track 1280 and travel within interior side channels 1271 of intra-aircraft guide rail track/s 1270. For example, support guides 1210 may be provided with optional motor or spring actuated outwardly-extendable/retractable rollers 1220 that move from an inward position for travel within side channels 1281 of deployment track/s 1280 to an outward position for travel within interior side channels 1271 of intra-aircraft guide rail track/s 1270 and back again. In such an exemplary embodiment, with deployment track 1280 locked in its extended downward position, support guides 1210 may be enabled to travel upward beyond the upper end of deployment track 128 and within interior side channels 1271 of intra-aircraft guide rail track/s 1270 so as to allow actuator 880 to rotate drive system pulley 860 to drive belt 808 to move elevator car 102 on past the upper end of deployment track 1280 to main deck 306 (and optionally higher to other levels) and back without requiring deployment track 1280 to be first retracted within aircraft 100.

Movement of deployment idler pulley carriages 813 may be accomplished using any suitable mechanism, but in the illustrated embodiment, a carriage drive motor actuator 881 may be employed to rotate dual ball screw mechanisms via axle 889, gearbox 882, and dual axles 883. As shown in FIG. 6E, each of axels 893 are rotatably coupled to a respective ball screw mechanism transmission 891 that is each coupled in turn to a threaded shaft (screw component) 885 that extends from its ball screw mechanism transmission 891 that is positioned adjacent support structure component 811. Each shaft 885 extends through a respective internally threaded ball or sleeve component 897 coupled to each of carriages 813 to a rotating support 893 for the shaft 885 that is positioned or coupled adjacent support structure component 815. In this embodiment, rotation of each of the ball screw mechanism shafts 885 within its respective threaded sleeve 897 moves a respective one of carriages 813 back and forth along the shaft 885 between support structure component 811 and support structure component 815 in order to move deployment idler pulley carriages 813 laterally back and forth (closer and farther) relative to the multi-track guide rail assemblies 809 as shown.

Returning to FIGS. 8A-8I, also illustrated are optional intra-aircraft hydraulic safety system 1202 and optional deployment hydraulic safety system 814. In this exemplary embodiment, each of intra-aircraft hydraulic safety system 1202 and deployment hydraulic safety system 814 are provided as safety hydraulic cylinder mechanisms which are incorporated into the intra-aircraft guide rail track and deployment track mechanisms, respectively. In particular, intra-aircraft hydraulic cylinder mechanism 1202 of this embodiment may be coupled between deployment track 1280 and the lowermost support guide 1210 of the same multi-track guide rail assembly 809 as shown, in this exemplary embodiment with the cylinder end of intra-aircraft hydraulic cylinder 1202 fixedly coupled to the upper end of deployment track 1280 and with the opposite (piston) end of intra-aircraft hydraulic cylinder mechanism 1202 attached to the lowermost support guide 1210 (or otherwise fixedly secured relative to the elevator car 102).

In the illustrated embodiment, the uppermost support guide 1210 is dimensioned to have sufficient clearance so that it can travel over cylinder component 1203 and piston component 1205 of intra-aircraft hydraulic cylinder mechanism 1202 when elevator car 102 travels up and down relative to deployment track 1280. To illustrate, FIGS. 8A-8C and 8G illustrate support guides and components of intra-aircraft hydraulic cylinder mechanism 1202 as they are positioned when elevator car is at the lower lobe level 308 with piston component 1205 extended from cylinder component 1203, and FIGS. 8D-8E illustrate components of intra-aircraft hydraulic cylinder mechanism 1202 as they are positioned when elevator car is at the main deck level 306 with piston component 1205 is retracted within cylinder component 1203. It is noted that piston component 1205 remains extended from cylinder component 1203 and travels with deployment track 1280 when track 1280 is extended from intra-aircraft guide rail track 1270 to deploy elevator car 102 to ground level 104.

When coupled as illustrated between a fixed portion of guide rail assembly 809 and the moving elevator car 102, intra-aircraft hydraulic cylinder 1202 may be configured so that it acts to limit the maximum rate of travel of elevator car 102 relative to the intra-aircraft guide rail track 1270 and the structure of aircraft 100. This characteristic may be accomplished by providing intra-aircraft hydraulic cylinder mechanism 1202 with internal flow resistors which are sized to induce a hydraulic fluid flow resistance that is sufficient to limit the rate of speed with which piston component 1205 can be extended from cylinder component 1203 (and optionally retracted into cylinder 1203) which in turn limits the speed with which elevator car 102 can free fall to minimize or eliminate risk of possible injury to elevator car passengers.

Still referring to FIGS. 8A-8I, optional deployment hydraulic safety system mechanism 814 may be coupled between intra-aircraft guide rail track 1270 and the lower end of deployment track 1280 of the same intra-aircraft guide rail assembly as shown, in this exemplary embodiment with the cylinder end of deployment hydraulic cylinder mechanism 814 fixedly coupled to the side of intra-aircraft guide rail track 1270 and with the opposite (piston) end of deployment hydraulic cylinder mechanism 814 attached to the lower end of deployment track 1280. As shown in the Figures, a deployment hydraulic cylinder mechanism 814 may be oriented on either side of a given guide rail assembly 809, i.e., in the Figures both orientations are shown with it being understood that either orientation is acceptable and that deployment hydraulic cylinder mechanisms 814 may be placed on the same side of each guide rail assembly 809 or on different sides of each guide rail assembly 809.

FIGS. 10C-10D and 8I illustrate relative positioning of deployment track 1280 and intra-aircraft guide rail track 1270 when elevator car 102 is deployed outside the fuselage of aircraft 100 to ground level 104. In this position, piston component 815 of optional deployment hydraulic cylinder mechanism 814 (when present) will be extended therebetween as shown in FIGS. 8H and 8I. When so coupled between intra-aircraft guide rail track 1270 and moving deployment track 1280, deployment hydraulic cylinder mechanism 814 may be configured so that it acts to limit the maximum rate of travel of deployment track 1280 and elevator car 102 relative to the intra-aircraft guide rail track 1270 and the structure of aircraft 100 in a manner similar to that described previously for intra-aircraft hydraulic cylinder mechanism 1202.

It will be understood that for most installations, the elevator car 102 is not occupied for flight operations (i.e., taxi, takeoff, and landing operations). The unoccupied elevator car 102, its support structure and the local primary structure at the elevator system support interfaces are substantiated for the emergency landing conditions presented in FAR 25.561 with the elevator car 102 located at the lower lobe level 308. The unoccupied elevator car 102, its support structure and the aircraft fuselage are substantiated for the taxi, takeoff and landing loads appropriate for the given aircraft. The occupied elevator car 102, its support structure and the aircraft fuselage are substantiated for the critical forward fuselage flight loads appropriate for the given aircraft and decompression loads developed for the intended floor plan.

Figure 11:
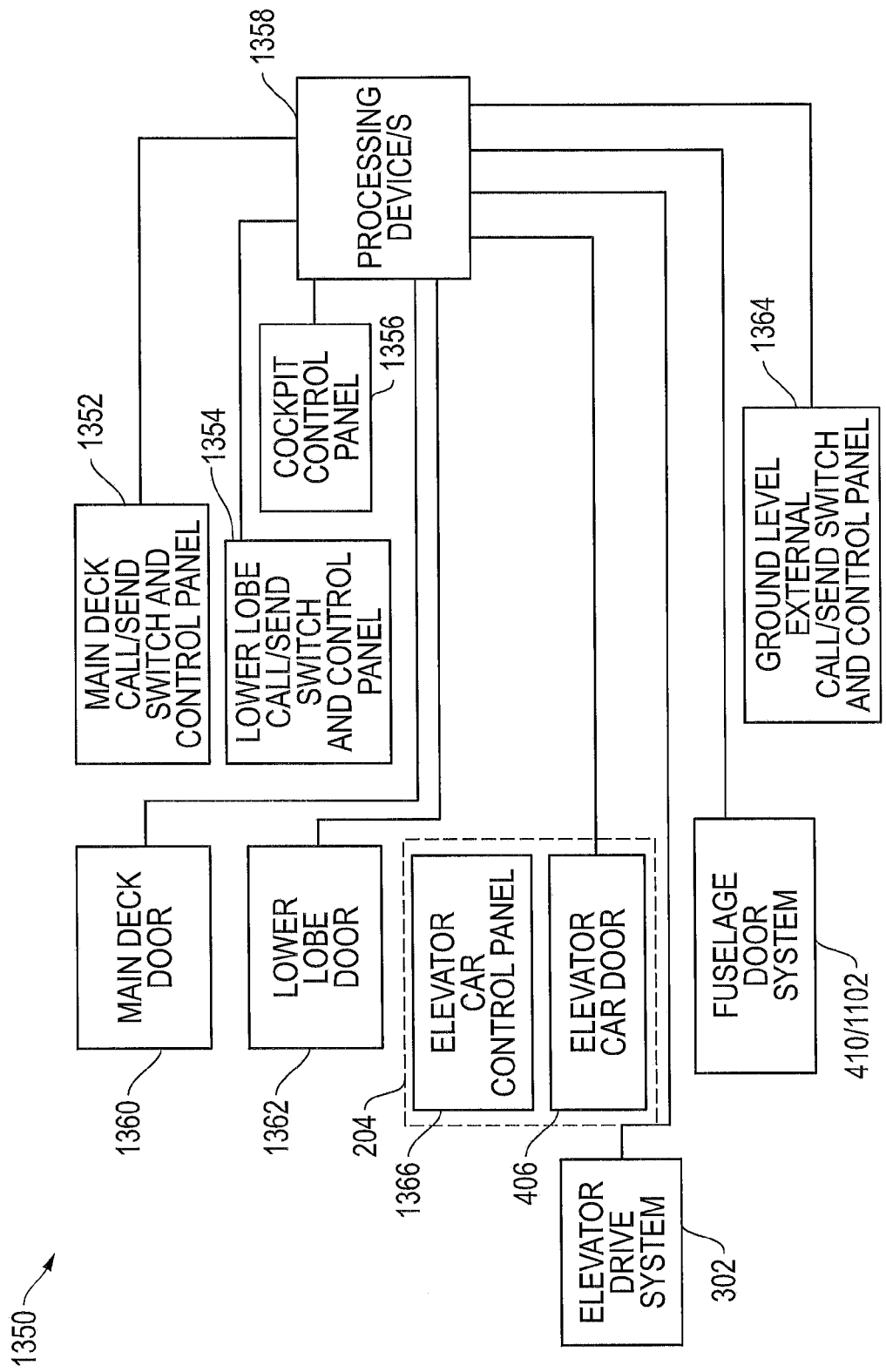
FIG. 11 illustrates a block diagram of an elevator control system according to one exemplary embodiment of the disclosed systems and methods.

FIG. 11 illustrates a block diagram of an elevator control system 1350 as it may be configured in one exemplary embodiment. As shown control system 1350 may include a cockpit control panel 1356 that is coupled to provide control inputs to, and receive status indications from, one or more processing devices 1358 (e.g., CPUs, controllers, microcontrollers, processors, microprocessors, FPGAs, ASICs, etc.). Control panels 1352, 1354 and 1364 at the various elevator car call locations may also be coupled to provide control inputs to processing devices 1358. Processing device/s 1358 may be operatively coupled to sensors, actuators and other electronic circuitry of system 1350 to receive sensor and status inputs regarding one or more of elevator car 102 and elevator car door assembly/ies 406, fuselage door 410, respective main level and lower lobe automated runway door assemblies 1360 and 1362, elevator drive system 302, call/send control panel 1366 within elevator car 102, and other system components. Processing devices 1358 may also be coupled to control various components of the elevator system such as fuselage door 410, main level and lower lobe runway doors 1360 and 1362, elevator car door assembly/ies 406, elevator drive system 302, etc.

Figure 12:
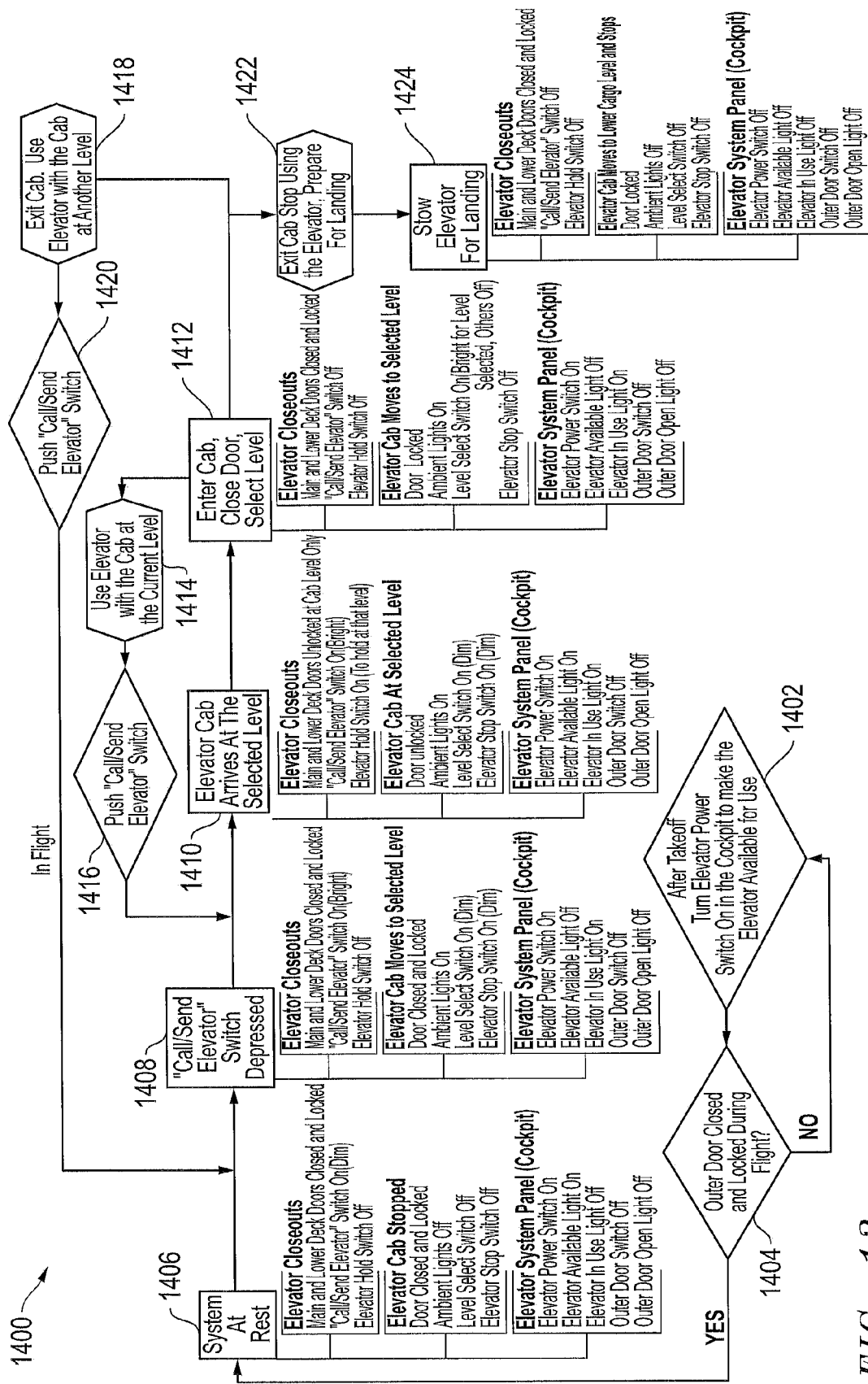
FIG. 12 illustrates operational logic for operating an elevator car during flight operations according to exemplary embodiment of the disclosed systems and methods.
Figure 13:
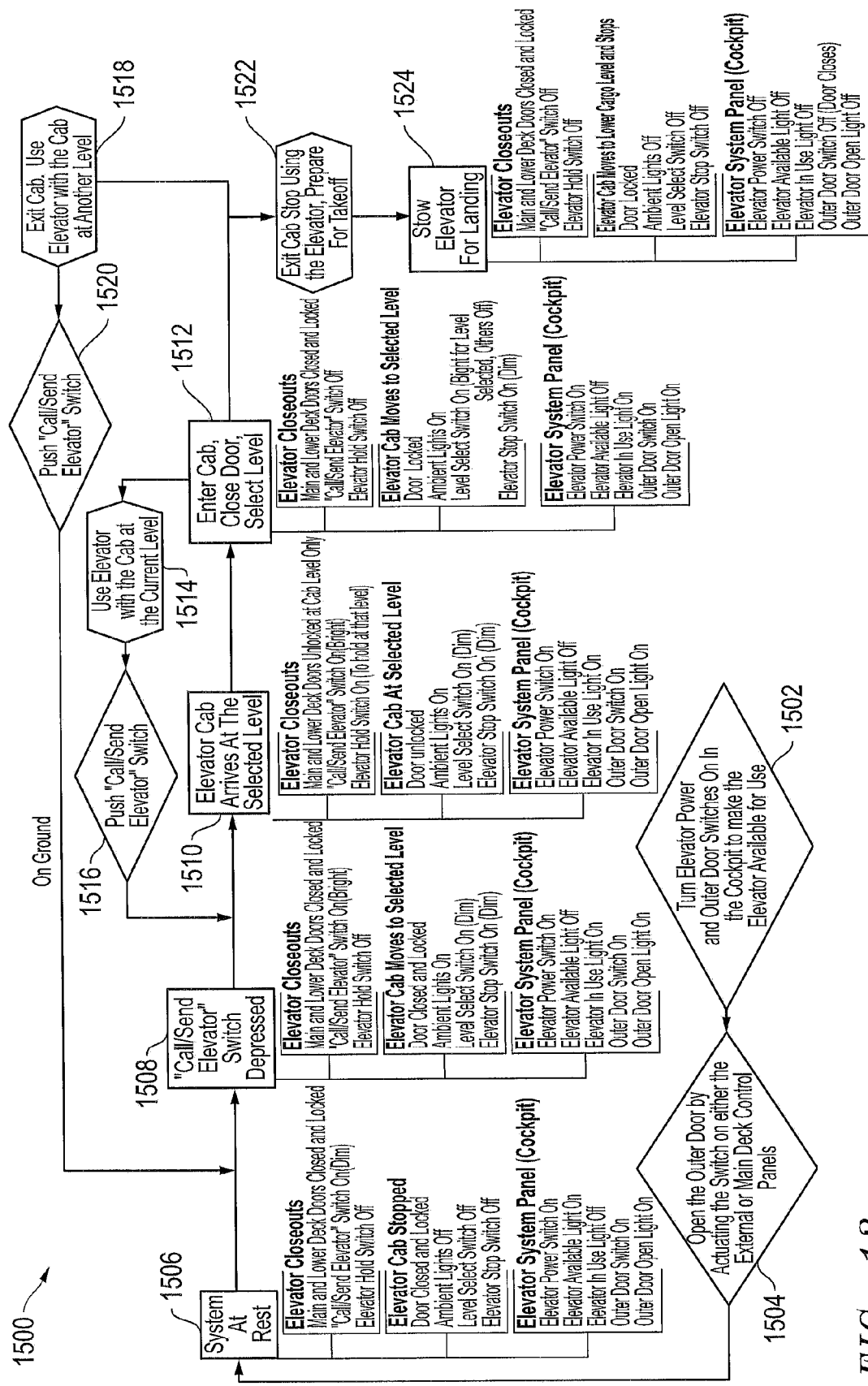
FIG. 13 illustrates operational logic for operating an elevator car during ground operations according to exemplary embodiment of the disclosed systems and methods.

FIGS. 12 and 13 illustrate operational logic for raising and lowering elevator car 102 according to exemplary embodiments of the disclosed systems and methods. Among other things, FIGS. 12 and 13 also illustrate the status of various system components (e.g. Elevator closeout components, elevator car (cab) components, elevator cockpit control panel components, etc.) during the various steps and conditions of elevator system operation. It will be understood that at least a portion of the steps of this operational logic may be performed by processing devices 1358 of control system 1350. Moreover, one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

The exemplary methodology 1400 of FIG. 12 may be employed during flight operations, i.e., gate to gate and at any other time that engines are running. During such flight operations, elevator car 102 remains at all times contained within fuselage of aircraft 100 with door 410 closed and secured. As shown in FIG. 12, methodology 1400 starts in step 1402 after takeoff, when the flight crew turns on the appropriate power switch/es on cockpit elevator system control panel 1356 to make elevator car 102 available for intra-aircraft use (e.g., by enabling actuation of drive system 320, elevator car door assemblies and other electronic control components, etc.). The power switch for fuselage door 410 and its motor 1102 is left in off position and not turned on at this time. After the power switch is activated in the cockpit, methodology 1400 proceeds to step 1404 where it verifies that fuselage door 410 is closed and locked or otherwise secured. If fuselage door 410 is not closed and so secured, methodology 1400 terminates by returning to step 1402 and will not proceed until fuselage door 410 is closed. If fuselage door 410 is closed and secured, then methodology 1400 proceeds to step 1406 where the elevator system is activated and at rest.

Still referring to FIG. 12, components of the elevator system remain at rest in step 1406 until one of call/send switches on control panels 1352 or 1354 is depressed by personnel to call or send the elevator car 102 to either the main deck level 306 or lower lobe level 308. In response, the elevator car 102 is dispatched using the drive system 302 to the level within the aircraft indicated by the depressed call/send switch, and the elevator car 102 arrives at the selected level in step 1410 where the appropriate elevator car door assembly 406 is opened together with the corresponding appropriate main deck or lower lobe runway door 1360 or 1362 (e.g., automated electrically operated sliding pocket door) that corresponds to the current location of the elevator car 102 to allow ingress to and egress from the interior of the elevator car 102. It will be understood that the runway doors 1360 and 1362 may be configured to operate in synchronized manner with elevator car door assembly/ies 406.

In step 1412, the opened elevator car door assembly 406 and corresponding main deck or lower lobe runway door 1360 or 1362 are closed, and in step 1416 the desired level is selected by personnel in the elevator car 102 using the elevator car call/send control panel 1366. The elevator car 102 is then moved using drive system 302 to the selected level in step 1410, where the appropriate elevator car door assembly 406 is opened together with the corresponding appropriate main deck or lower lobe runway door 1360 or 1362 that corresponds to the current level. At this time, the elevator systems awaits a call/send switch to be pressed again. As shown in step 1418, after personnel exit from the cab and when the elevator car 102 is at a different level, personnel may call the elevator to their current different level in step 1420 using one of call/send switches on control panels 1352 or 1354, and the process is repeated. Barring in-flight turbulence or other unexpected event, steps 1408-1420 may be repeated as often as desired during the duration of flight operations.

Upon preparation for landing, personnel are instructed to cease use of the elevator system in step 1422 and all personnel exit the elevator car 102 (e.g., in conjunction with cessation of other pre-landing checklist activities). Next, in step 1424 the elevator car 102 is moved to lower lobe 308 and other elevator system components are stowed for landing. As shown, elevator system power is shut-off using the cockpit control panel 1356 prior to landing.

The exemplary methodology 1500 of FIG. 13 may be employed for ground-access while aircraft 100 is parked stationary on the ground, e.g., with no engines running. As shown in FIG. 12, methodology 1500 starts in step 1502, when the flight crew turns on the main elevator system power switch on cockpit elevator system control panel 1356 to make elevator car 102 available for use (e.g., by enabling actuation of drive system 320, door and other electronic control components, etc.). The appropriate power switch for fuselage door 410 and its motor 1102 is also turned on at this time. Methodology 1500 then proceeds to step 1504 where fuselage door 410 is opened by the elevator control system 1350 (e.g., in response to appropriate command from one of control panels 1352, 1354 or 1364) and elevator system enters a state of rest in step 1506. However, the pilot (e.g., via power switch in the cockpit) is required to initiate opening of the fuselage door 410. When the fuselage door 410 is activated to be opened, the fuselage door mechanism is activated, the pressure seal released, and door 410 is retracted within the lower lobe 308, in essence concealing it from an observer outside the aircraft 100. Fuselage door 410 stays in the open position until activated to close by the elevator control system 1350.

Still referring to FIG. 13, components of the elevator system remain at rest in step 1506 until one of call/send switches on control panels 1352, 1354 or 1364 is depressed by personnel to call or send the elevator car 102 to either the main deck level 306, lower lobe level 308 or ground level 104. In response, the elevator car 102 is dispatched using the drive system 302 to the level indicated by the depressed call/send switch, and the elevator car 102 arrives at the selected level in step 1510 where the appropriate elevator car door assembly 406 is opened by itself if at ground level 104 or is opened together with the corresponding appropriate main deck or lower lobe runway door 1360 or 1362 that corresponds to the current location of the elevator car 102 within the aircraft 100. In step 1512, the opened elevator car door assembly 406 (together with any corresponding open main deck or lower lobe runway door 1360 or 1362) is closed, and the desired level is selected by personnel in the elevator car 102 in step 1516 using the elevator car call/send control panel 1366. The elevator car 102 is then moved using drive system 302 to the selected level, where the appropriate elevator car door assembly 406 is opened together with a corresponding appropriate main deck or lower lobe runway door 1360 or 1362 (if applicable). At this time, the elevator systems awaits a call/send switch to be pressed again. As shown in step 1518, after personnel exit from the cab and when the elevator car 102 is at a different level, personnel at a different level from the current level of the elevator car 102 may call the elevator to their current level in step 1520 using one of call/send switches on control panels 1352 or 1354, and the process is repeated. Until commencement of pre-flight operations and checklist, steps 1508-1520 may be repeated as often as desired during the duration of flight operations.

Upon preparation for departure, personnel are instructed to cease use of the elevator system in step 1522 and all personnel exit the elevator car 102 (e.g., in conjunction with cessation of other pre-departure checklist activities). Next, in step 1524 the elevator car 102 is moved to lower lobe 308 and other elevator system components are stowed for landing. This includes shutting and sealing fuselage door 410. Elevator system power is shut-off using the cockpit control panel 1356. The appropriate power switch for fuselage door 410 and its motor 1102 is also turned off at this time.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A ground-accessing vehicle elevator system, comprising:
    at least one multi-track guide rail assembly configured for installation between multiple levels of a vehicle, the multi-track guide rail assembly comprising an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track; and
    an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle;
    where the elevator car is configured to be deployed outside a body of the vehicle in engaged relationship with the deployment track either together with or after movement of the deployment track from the retracted position to the extended position;
    where the elevator car is configured to be retracted into the body of the vehicle in engaged relationship with the deployment track either together with or before movement of the deployment track from the extended position to the retracted position; and
    where the ground-accessing vehicle elevator system further comprises at least one belt and drive pulley system that includes:
        a fixed upper guide rail assembly pulley configured to be coupled adjacent to and in fixed relationship to an upper end of the multi-track guide rail assembly,
        a movable lower guide rail assembly pulley coupled to a lower end of the deployment track, the movable lower guide rail assembly pulley being configured to move with the deployment track from the retracted position to the extended position relative to the intra-vehicle guide rail track such that a distance between the fixed upper guide rail assembly pulley and the movable lower guide rail assembly pulley is greater when the deployment track is in the extended position than when the deployment track is in the retracted position with the fixed upper guide rail assembly pulley coupled in fixed relationship to and adjacent to the upper end of the multi-track guide rail assembly, and
        a drive belt fixedly coupled to the elevator car at one or more fixed coupling points, each of the coupling points coupling the drive belt in fixed relationship to the elevator car, the drive belt extending from the fixed upper guide rail assembly pulley downward to one of the fixed coupling points to the elevator car, and the drive belt also extending from the movable lower guide rail assembly pulley upward to one of the fixed coupling points to the elevator car with the elevator car coupled to the drive belt in-between the fixed upper guide rail assembly pulley and movable lower guide rail assembly pulley, the drive belt being configured to move between the fixed upper guide rail assembly pulley and the movable lower guide rail assembly pulley so as to move the engaged elevator car relative to the deployment track between the multiple levels of the vehicle with the deployment track held in stationary relationship to the intra-vehicle guide rail track; and
    where the length of the drive belt disposed between the fixed upper guide rail assembly pulley and the movable lower guide rail assembly pulley is also variable to allow the deployment track with the movable lower guide rail assembly pulley to move between the retracted position and the extended position relative to the intra-vehicle guide rail track; and
    where the drive belt comprises a single common drive belt coupled between the fixed upper guide rail assembly pulley and the movable lower guide rail assembly pulley; where the drive belt extends from the fixed upper guide rail assembly pulley downward directly to one of the fixed coupling points and extends from the movable lower guide rail assembly pulley upward directly to one of the fixed coupling points; and where the drive belt is configured to move between the fixed upper guide rail assembly pulley and the movable lower guide rail assembly pulley while a length of the drive belt disposed between the fixed upper guide rail assembly pulley and the movable lower guide rail assembly pulley remains constant so as to move the engaged elevator car relative to the deployment track between the multiple levels of the vehicle while the deployment track is fixed relative to the intra-vehicle guide rail track.

2. The elevator system of claim 1, where the vehicle is a fixed-wing aircraft; where the body of the vehicle is a fuselage of the aircraft; where the intra-vehicle guide rail track is an intra-aircraft guide rail track; where the deployment track is configured to move from the retracted position to the extended position relative to the intra-aircraft guide rail track without the elevator car and before deployment of the elevator car outside the fuselage of the aircraft; and where the deployment track is configured to move from the extended position to the retracted position relative to the intra-aircraft guide rail track without the elevator car and after retraction of the elevator car into the fuselage of the aircraft.

3. The elevator system of claim 2, where the drive belt is fixedly coupled to a side of the elevator car in cantilevered relationship to the elongated deployment track and configured to move the engaged elevator car relative to the deployment track between the multiple levels of the aircraft.

4. The elevator system of claim 1, where the ground-accessing vehicle elevator system comprises multiple belt and drive pulley systems.

5. The elevator system of claim 1, where the drive belt is further configured to selectively allow the deployment track to move from the retracted position to the extended position relative to the intra-aircraft guide rail track with the elevator car in engaged relationship with the deployment track so as to deploy the elevator car outside the body of the vehicle and to selectively cause the deployment track to move from the extended position to the retracted position relative to the intra-vehicle guide rail track with the elevator car in engaged relationship with the deployment track so as to retract the elevator car into the body of the vehicle; and where the drive belt is further configured to move the elevator car down and up relative to the extended deployment track so as to deploy the elevator car outside the body of the vehicle and retract the elevator car into the body of the vehicle respectively while the deployment track remains in the extended position outside the body of the vehicle.

6. The elevator system of claim 1, where the drive belt is further configured to selectively allow the deployment track to move from the retracted position to the extended position relative to the intra-aircraft guide rail track; and then move the elevator car down and up relative to the extended deployment track so as to deploy the elevator car outside the body of the vehicle and retract the elevator car into the body of the vehicle respectively while the deployment track remains in the extended position outside the body of the vehicle.

7. The elevator system of claim 1, where the multi-rail guide rail assembly and at least one belt and drive pulley system are further configured to:
 selectively allow the deployment track to move from the retracted position to the extended position relative to the intra-aircraft guide rail track;
 then move the elevator car at least one of down or up relative to the extended deployment track so as to deploy the elevator car outside the body of the vehicle or retract the elevator car into the body of the vehicle respectively while the deployment track remains in the extended position outside the body of the vehicle; and
 then retract the deployment track from the extended position to the retracted position relative to the intra-aircraft guide rail track.

8. The elevator system of claim 1, where the drive belt extends in a straight line defined between the upper guide rail pulley and the lower guide rail pulley in substantially parallel relationship to the elongated intra-vehicle guide rail track and the elongated deployment track along a path of the elevator car relative to the deployment track.

9. The elevator system of claim 1, where the drive belt has opposing first and second ends, the first end of the drive belt being fixedly coupled to a first side of the elevator car at one of the fixed coupling points to the elevator car, and the second end of the drive belt being fixedly coupled to the first side of the elevator car at one of the fixed coupling points to the elevator car.

10. The elevator system of claim 1, where the drive belt has a first portion extending from the fixed upper guide rail assembly pulley downward to one of the fixed coupling points to the elevator car; where the drive belt has a second and different portion extending from the movable lower guide rail assembly pulley upward to one of the fixed coupling points to the elevator car; where the upper pulley, lower pulley, and one or more fixed coupling points to the elevator car are all aligned with each other in a single straight line that extends from the fixed upper guide rail assembly pulley to the movable lower guide rail assembly pulley and that is oriented substantially parallel to the elongated intra-vehicle guide rail track and the elongated deployment track; where the first portion is coupled from above to one of the fixed coupling points to the elevator car; and where the second portion is coupled from below to one of the fixed coupling points to the elevator car.

11. The elevator system of claim 10, where the first and second portions are different portions of the same drive belt.

12. A multi-level vehicle equipped with a ground-accessing elevator system, the vehicle comprising:
 a vehicle body containing multiple levels therein;
 at least one multi-track guide rail assembly disposed between the multiple levels of the vehicle, the multi-track guide rail assembly comprising an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track; and
 an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle;
 where the deployment track is configured to move from the retracted position to the extended position relative to the intra-vehicle guide rail track;
 where the elevator car is configured to be deployed outside a body of the vehicle in engaged relationship with the deployment track either together with or after extension of the deployment track;
 where the elevator car is configured to be retracted into the body of the vehicle in engaged relationship with the deployment track either together with or before retraction of the deployment track; and
 where the ground-accessing vehicle elevator system further comprises at least one belt and drive pulley system that includes:
  a fixed upper guide rail assembly pulley coupled in fixed relationship to and adjacent to an upper end of the multi-track guide rail assembly,
  a movable lower guide rail assembly pulley coupled to a lower end of the deployment track, the movable lower guide rail assembly pulley being configured to move with the deployment track from the retracted position to the extended position relative to the intra-vehicle guide rail track such that a distance between the fixed upper guide rail assembly pulley and the movable lower guide rail assembly pulley is greater when the deployment track is in the extended position than when the deployment track is in the retracted position and when the fixed upper guide rail assembly pulley is coupled in fixed relationship to and adjacent to the upper end of the multi-track guide rail assembly, and a drive belt fixedly coupled to the elevator car at one or more fixed coupling points, each of the coupling points coupling the drive belt in fixed relationship to the elevator car, the drive belt having a first portion extending from the fixed upper guide rail assembly pulley downward to one of the fixed coupling points to the elevator car, and the drive belt having a second and different portion extending from the movable lower guide rail assembly pulley upward to one of the fixed coupling points to the elevator car, the drive belt being configured to move between the fixed upper guide rail assembly pulley and the movable lower guide rail assembly pulley so as to move the engaged elevator car relative to the deployment track between the multiple levels of the vehicle with the deployment track held in stationary relationship to the intra-vehicle guide rail track; and where the length of the drive belt disposed between the fixed upper guide rail assembly pulley and the movable lower guide rail assembly pulley is also variable to allow the deployment track with the movable lower guide rail assembly pulley to move between the retracted position and the extended position relative to the intra-vehicle guide rail track; and where the drive belt comprises a single common drive belt coupled between the fixed upper guide rail assembly pulley and the movable lower guide rail assembly pulley; where the drive belt extends from the fixed upper guide rail assembly pulley downward directly to one of the fixed coupling points and extends from the movable lower guide rail assembly pulley upward directly to one of the fixed coupling points; and where the drive belt is configured to move between the fixed upper guide rail assembly pulley and the movable lower guide rail assembly pulley while a length of the drive belt disposed between the fixed upper guide rail assembly pulley and the movable lower guide rail assembly pulley remains constant so as to move the engaged elevator car relative to the deployment track between the multiple levels of the vehicle while the deployment track is fixed relative to the intra-vehicle guide rail track.

13. The vehicle of claim 12, where the vehicle is a fixed-wing aircraft; where the body of the vehicle is a fuselage of the aircraft; where the intra-vehicle guide rail track is an intra-aircraft guide rail track; where the deployment track is configured to move from the retracted position to the extended position relative to the intra-aircraft guide rail track without the elevator car and before deployment of the elevator car outside the fuselage of the aircraft; and where the deployment track is configured to move from the extended position to the retracted position relative to the intra-aircraft guide rail track without the elevator car and after retraction of the elevator car into the fuselage of the aircraft.

14. The vehicle of claim 13, where the deployment track is configured to be selectively locked in the retracted position relative to the intra-aircraft guide rail track during flight operations of the aircraft; where the belt and drive pulley system is configured to move the engaged elevator car relative to the deployment track between the multiple levels of the aircraft during flight operations and while the deployment track is locked in the retracted position relative to the intra-aircraft guide rail track; and where the deployment track is configured to be selectively unlocked to allow the deployment track to move from the retracted position to the extended position relative to the intra-aircraft guide rail track when the aircraft is parked stationary on the ground.

15. The vehicle of claim 13, further comprising:
a cockpit;
a drive mechanism coupled to actuate the belt and drive pulley system; and
an elevator control system coupled to control the drive mechanism and including a control panel disposed in the cockpit of the aircraft, the control panel configured to selectively activate and deactivate the drive system of the elevator system.

16. The vehicle of claim 13, where the multiple levels of the fuselage include a lowermost level; where the aircraft fuselage comprises a fuselage skin with an elevator opening defined therein; and where the aircraft further comprises a fuselage door assembly disposed between the elevator car and the elevator opening defined in the fuselage skin of the aircraft, the fuselage door assembly comprising an elongated elevator door and fuselage door tracks disposed within the fuselage, the fuselage door being configured to selectively travel within the fuselage along the elongated fuselage door tracks from a closed position that seals the elevator opening when the deployment track is in the retracted position relative to the intra-aircraft guide rail track with the elevator car inside the fuselage of the aircraft and an open position to allow the deployment track to move from the retracted position to the extended position relative to the intra-aircraft guide rail track with the elevator car in engaged relationship with the deployment track so as to deploy the elevator car through the elevator door opening to a position outside the fuselage of the aircraft, the fuselage door being configured to travel within the fuselage along the elongated fuselage door tracks between the closed and open positions beneath the elevator car when the elevator car is positioned within the lowermost level of the aircraft.

17. The vehicle of claim 13, where the multiple levels of the aircraft comprise a main deck level and a lower lobe.

18. The vehicle of claim 12, where the ground-accessing vehicle elevator system comprises multiple belt and drive pulley systems.

19. The vehicle of claim 12, where the fixed upper guide rail assembly pulley is coupled to an internal structure of the vehicle in fixed relationship adjacent an upper end of the multi-track guide rail assembly.

20. A method for operating a ground-accessing elevator system for a multi-level vehicle, the method comprising:
providing a vehicle body containing multiple levels therein;
providing at least one multi-track guide rail assembly disposed between the multiple levels of the vehicle, the multi-track guide rail assembly comprising an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track;
providing an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle;

providing at least one belt and drive pulley system that includes:
- a fixed upper guide rail assembly pulley coupled in fixed relationship to and adjacent to an upper end of the multi-track guide rail assembly, and
- a movable lower guide rail assembly pulley coupled to the lower end of the deployment track, the movable lower guide rail assembly pulley being configured to move with the deployment track from the retracted position to the extended position relative to the intra-vehicle guide rail track such that a distance between the fixed upper guide rail assembly pulley and the movable lower guide rail assembly pulley is greater when the deployment track is in the extended position than when the deployment track is in the retracted position and when the fixed upper guide rail assembly pulley is coupled in fixed relationship to and adjacent to the upper end of the multi-track guide rail assembly,
- a drive belt fixedly coupled to the elevator car at one or more fixed coupling points, each of the coupling points coupling the drive belt in fixed relationship to the elevator car, the drive belt extending from the fixed upper guide rail assembly pulley downward to one of the fixed coupling points to the elevator car, and the drive belt also extending from the movable lower guide rail assembly pulley upward to one of the fixed coupling points to the elevator car with the elevator car coupled to the drive belt in-between the fixed upper guide rail assembly pulley and movable lower guide rail assembly pulley, the drive belt being configured to move between the fixed upper guide rail assembly pulley and the movable lower guide rail assembly pulley so as to move the engaged elevator car relative to the deployment track between the multiple levels of the vehicle with the deployment track held in stationary relationship to the intra-vehicle guide rail track, and
- where the length of the drive belt disposed between the fixed upper guide rail assembly pulley and the movable lower guide rail assembly pulley is also variable to allow the deployment track with the movable lower guide rail assembly pulley to move between the retracted position and the extended position relative to the intra-vehicle guide rail track, and
- where the drive belt comprises a single common drive belt coupled between the fixed upper guide rail assembly pulley and the movable lower guide rail assembly pulley; where the drive belt extends from the fixed upper guide rail assembly pulley downward directly to one of the fixed coupling points and extends from the movable lower guide rail assembly pulley upward directly to one of the fixed coupling points; and where the drive belt is configured to move between the fixed upper guide rail assembly pulley and the movable lower guide rail assembly pulley while a length of the drive belt disposed between the fixed upper guide rail assembly pulley and the movable lower guide rail assembly pulley remains constant so as to move the engaged elevator car relative to the deployment track between the multiple levels of the vehicle while the deployment track is fixed relative to the intra-vehicle guide rail track; and using the drive belt to move the deployment track from the retracted position to the extended position relative to the intra-vehicle guide rail track, and using the drive belt to move the elevator car in engaged relationship with the deployment track to deploy the elevator car outside the body of the vehicle either together with or after moving the deployment track to the extended position; and using the drive belt to move the elevator car in engaged relationship with the deployment track to retract the elevator car into the body of the vehicle, and using the drive belt to move the deployment track from the extended position to the retracted position relative to the intra-vehicle guide rail track either together with or after retracting the elevator car into the body of the vehicle.

21. The method of claim 20, where the vehicle is a fixed-wing aircraft; where the vehicle body is a fuselage of the aircraft; where the intra-vehicle guide rail track is an intra-aircraft guide rail track; and where the method further comprises:
- using the drive belt to move the deployment track from the retracted position to the extended position relative to the intra aircraft guide rail track;
- then at least one of deploying the elevator car outside the fuselage of the aircraft or retracting the elevator car into the fuselage of the aircraft while the deployment track remains in the extended position outside the fuselage of the aircraft; and
- then using the drive belt to move the deployment track from the extended position to the retracted position relative to the intra aircraft guide rail track.

22. The method of claim 21, further comprising locking the deployment track in the retracted position relative to the intra-aircraft guide rail track during flight operations of the aircraft; using the belt and drive pulley system to move the engaged elevator car relative to the deployment track between the multiple levels of the aircraft during flight operations and while the deployment track is locked in the retracted position relative to the intra-aircraft guide rail track; and unlocking the deployment track to allow the deployment track to move from the retracted position to the extended position relative to the intra-aircraft guide rail track when the aircraft is parked stationary on the ground.

23. The method of claim 21, further comprising:
- providing the belt and drive pulley system coupled to a side of the elevator car in cantilevered relationship to the elongated deployed track; and
- using the belt and drive pulley system to move the engaged elevator car relative to the deployment track between the multiple levels of the aircraft.

24. The method of claim 21, further comprising:
- moving the single common drive belt between the fixed upper guide rail assembly pulley and the movable lower guide rail assembly pulley to move the engaged elevator car relative to the deployment track between the multiple levels of the aircraft while the deployment track is in the retracted position relative to the intra-aircraft guide rail track;
- allowing the deployment track to move from the retracted position to the extended position relative to the intra-aircraft guide rail track with the elevator car in engaged relationship with the deployment track to deploy the elevator car outside the fuselage of the aircraft; and
- moving the deployment track from the extended position to the retracted position relative to the intra-aircraft guide rail track with the elevator car in engaged relationship with the deployment track to retract the elevator car into the fuselage of the aircraft.

25. The method of claim 21, where the multiple levels of the aircraft comprise a main deck level and a lower lobe.

26. The method of claim 20, further comprising using the drive belt to selectively allow the deployment track from the retracted position to the extended position relative to the intra-aircraft guide rail track; and then moving the elevator car down and up relative to the extended deployment track so as to deploy the elevator car outside the body of the vehicle and retract the elevator car into the body of the vehicle respectively while the deployment track remains in the extended position outside the body of the vehicle.

27. The method of claim 20, where the method comprises providing multiple belt and drive pulley systems.

28. A ground-accessing vehicle elevator system, comprising:
at least one multi-track guide rail assembly configured for installation between multiple levels of a vehicle, the multi-track guide rail assembly comprising an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track;
an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle and between a fixed upper guide rail assembly pulley and a movable lower guide rail assembly pulley; and
a drive belt fixedly coupled to the elevator car and extending from the fixed upper guide rail assembly pulley downward to the elevator car, and the drive belt also extending from the movable lower guide rail assembly pulley upward to the elevator car, the drive belt being configured to move between the fixed upper guide rail assembly pulley and the movable lower guide rail assembly pulley so as to move the engaged elevator car relative to the deployment track between the multiple levels of the vehicle with the deployment track held in stationary relationship to the intra-vehicle guide rail track;
where the elevator car is configured to be deployed outside a body of the vehicle in engaged relationship with the deployment track either together with or after movement of the deployment track from the retracted position to the extended position;
where the elevator car is configured to be retracted into the body of the vehicle in engaged relationship with the deployment track either together with or before movement of the deployment track from the extended position to the retracted position; and
where the deployment track is configured to be locked in fixed relationship relative to the intra-vehicle guide rail track; and
where the elevator car is configured to be free to move up and down relative to the deployment track while the deployment track is locked in fixed relationship relative to the intra-vehicle guide rail track; and
where a length of the drive belt disposed between the fixed upper guide rail assembly pulley and the movable lower guide rail assembly pulley is also variable to allow the deployment track with the movable lower guide rail assembly pulley to move between the retracted position and the extended position relative to the intra-vehicle guide rail track; and
where the drive belt comprises a single common drive belt coupled between the fixed upper guide rail assembly pulley and the movable lower guide rail assembly pulley; where the drive belt extends from the fixed upper guide rail assembly pulley downward directly to the elevator car and extends from the movable lower guide rail assembly pulley upward directly to the elevator car; and where the drive belt is configured to move between the fixed upper guide rail assembly pulley and the movable lower guide rail assembly pulley while a length of the drive belt disposed between the fixed upper guide rail assembly pulley and the movable lower guide rail assembly pulley remains constant so as to move the engaged elevator car relative to the deployment track between the multiple levels of the vehicle while the deployment track is fixed relative to the intra-vehicle guide rail track.

29. A multi-level vehicle equipped with a ground-accessing elevator system, the vehicle comprising:
a vehicle body containing multiple levels therein;
at least one multi-track guide rail assembly disposed between the multiple levels of the vehicle, the multi-track guide rail assembly comprising an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track; and
an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle and between a fixed upper guide rail assembly pulley and a movable lower guide rail assembly pulley; and
a drive belt fixedly coupled to the elevator car and extending from the fixed upper guide rail assembly pulley downward to the elevator car, and the drive belt also extending from the movable lower guide rail assembly pulley upward to the elevator car, the drive belt being configured to move between the fixed upper guide rail assembly pulley and the movable lower guide rail assembly pulley so as to move the engaged elevator car relative to the deployment track between the multiple levels of the vehicle with the deployment track held in stationary relationship to the intra-vehicle guide rail track;
where the deployment track is configured to move from the retracted position to the extended position relative to the intra-vehicle guide rail track;
where the elevator car is configured to be deployed outside a body of the vehicle in engaged relationship with the deployment track either together with or after extension of the deployment track;
where the deployment track is configured to be locked in fixed relationship relative to the intra-vehicle guide rail track; and
where the elevator car is configured to be free to move up and down relative to the deployment track while the deployment track is locked in fixed relationship relative to the intra-vehicle guide rail track; and where a length of the drive belt disposed between the fixed upper guide rail assembly pulley and the movable lower guide rail assembly pulley is also variable to allow the deployment track with the movable lower guide rail assembly pulley to move between the retracted position and the extended position relative to the intra-vehicle guide rail track; and where the drive belt comprises a single common drive belt coupled between the fixed upper guide rail assembly pulley and the movable lower guide rail assembly pulley; where the drive belt extends from the fixed upper guide rail assembly pulley downward directly to the elevator car and extends from the movable lower guide rail assembly pulley upward directly to the elevator car; and where the drive belt is configured to move between the fixed upper guide rail assembly pulley and the movable lower guide rail assembly pulley while a length of the drive belt disposed between the fixed upper guide rail assembly pulley and the movable lower guide rail assembly pulley remains constant so as to move the engaged elevator car relative to the deployment track between the multiple levels of the vehicle while the deployment track is fixed relative to the intra-vehicle guide rail track.

30. The vehicle of claim 29, where the vehicle is a fixed-wing aircraft; where the body of the vehicle is a fuselage of the aircraft; where the intra-vehicle guide rail track is an intra-aircraft guide rail track; where the deployment track is configured to be locked in fixed relationship and retracted position relative to the intra-aircraft guide rail track during flight operations of the aircraft; and where the elevator car is configured to be free to move up and down relative to the deployment track between the multiple levels of the aircraft with the deployment track locked in fixed relationship and retracted position relative to the intra-vehicle guide rail track during flight operations of the aircraft.

31. A method for operating a ground-accessing elevator system for a multi-level vehicle, the method comprising:
providing a vehicle body containing multiple levels therein;
providing at least one multi-track guide rail assembly disposed between the multiple levels of the vehicle, the multi-track guide rail assembly comprising an elongated intra-vehicle guide rail track and a separate elongated deployment track movably coupled in adjacent parallel relationship to the intra-vehicle guide rail track, the separate deployment track being configured to move between a retracted position and an extended position relative to the intra-vehicle guide rail track;
providing an elevator car coupled in moveable engaged relationship to the elongated deployment track of each multi-track guide rail assembly, the deployment track configured to support the elevator car and guide the movement of the engaged elevator car relative to the deployment track up and down between the multiple levels of the vehicle and between a fixed upper guide rail assembly pulley and a movable lower guide rail assembly pulley; and
providing a drive belt fixedly coupled to the elevator car and extending from the fixed upper guide rail assembly pulley downward to the elevator car, and the drive belt also extending from the movable lower guide rail assembly pulley upward to the elevator car, the drive belt being configured to move between the fixed upper guide rail assembly pulley and the movable lower guide rail assembly pulley so as to move the engaged elevator car relative to the deployment track between the multiple levels of the vehicle with the deployment track held in stationary relationship to the intra-vehicle guide rail track;
where the deployment track is configured to move from the retracted position to the extended position relative to the intra-vehicle guide rail track;
where the elevator car is configured to be deployed outside a body of the vehicle in engaged relationship with the deployment track either together with or after extension of the deployment track, and
where the drive belt comprises a single common drive belt coupled between the fixed upper guide rail assembly pulley and the movable lower guide rail assembly pulley; where the drive belt extends from the fixed upper guide rail assembly pulley downward directly to the elevator car and extends from the movable lower guide rail assembly pulley upward directly to the elevator car; and where the drive belt is configured to move between the fixed upper guide rail assembly pulley and the movable lower guide rail assembly pulley while a length of the drive belt disposed between the fixed upper guide rail assembly pulley and the movable lower guide rail assembly pulley remains constant so as to move the engaged elevator car relative to the deployment track between the multiple levels of the vehicle while the deployment track is fixed relative to the intra-vehicle guide rail track; and
where the method further comprises:
locking the deployment track in fixed relationship relative to the intra-vehicle guide rail track,
moving the elevator car up and down relative to the deployment track while the deployment track is locked in fixed relationship relative to the intra-vehicle guide rail track, and
varying a length of the drive belt disposed between the fixed upper guide rail assembly pulley and the movable lower guide rail assembly pulley to move the deployment track with the movable lower guide rail assembly pulley between the retracted position and the extended position relative to the intra-vehicle guide rail track.

32. The method of claim 31, where the vehicle is a fixed-wing aircraft; where the body of the vehicle is a fuselage of the aircraft; where the intra-vehicle guide rail track is an intra-aircraft guide rail track; and where the method further comprises locking the deployment track in fixed relationship and retracted position relative to the intra-aircraft guide rail track during flight operations of the aircraft, and moving the elevator car up and down relative to the deployment track between the multiple levels of the aircraft while the deployment track locked is locked in fixed relationship and retracted position relative to the intra-vehicle guide rail track during flight operations of the aircraft.

* * * * *